United States Patent
Kitagawa (12)

(10) Patent No.: US 9,484,848 B2
(45) Date of Patent: Nov. 1, 2016

(54) MOTOR CONTROLLER

(71) Applicant: ASMO CO., LTD., Kosai (JP)

(72) Inventor: Takayuki Kitagawa, Toyohashi (JP)

(73) Assignee: ASMO CO., LTD., Kosai (JP)

( * ) Notice: Subject to any disclaimer, the term of this patent is extended or adjusted under 35 U.S.C. 154(b) by 229 days.

(21) Appl. No.: 14/450,288

(22) Filed: Aug. 4, 2014

(65) Prior Publication Data

US 2015/0042252 A1    Feb. 12, 2015

(30) Foreign Application Priority Data

Aug. 6, 2013 (JP) ................................. 2013-163561
Aug. 6, 2013 (JP) ................................. 2013-163562

(51) Int. Cl.
| | |
|---|---|
| *H02P 7/00* | (2016.01) |
| *H02P 7/06* | (2006.01) |
| *H02P 27/08* | (2006.01) |
| *H02H 7/085* | (2006.01) |

(52) U.S. Cl.
CPC .............. *H02P 7/06* (2013.01); *H02H 7/0858* (2013.01); *H02P 27/08* (2013.01); *H02P 29/032* (2016.02)

(58) Field of Classification Search
CPC ........... H02P 29/0044; H02P 29/0055; H02P 29/0088; H02P 29/02; H02P 31/00; H02P 6/28; H02P 27/06; H02P 29/0033; H02P 3/18; H02P 7/06
USPC ......... 318/434, 571, 400.06, 400.15, 400.21, 318/400.26, 268, 432, 469, 47
See application file for complete search history.

(56) References Cited

U.S. PATENT DOCUMENTS

| | | | | |
|---|---|---|---|---|
| 4,386,305 A | * | 5/1983 | Kohzai | ................... B23Q 15/12 318/39 |
| 5,184,053 A | * | 2/1993 | Maruo | ................. G05B 19/186 318/39 |
| 6,724,167 B1 | * | 4/2004 | Tanaka | ................. G05B 19/406 318/560 |
| 6,922,029 B2 | * | 7/2005 | Fuse | ......................... H02P 6/20 318/400.11 |
| 2009/0115364 A1 | * | 5/2009 | Harada | .................... H02M 1/32 318/434 |

FOREIGN PATENT DOCUMENTS

| | | | |
|---|---|---|---|
| JP | 2001286179 A | * | 10/2001 |
| JP | 2002199773 A | * | 7/2002 |
| JP | 2003-348883 A | | 12/2003 |
| JP | 3801015 B | | 7/2006 |
| JP | 2007-37292 A | | 2/2007 |
| JP | 2007-228704 A | | 9/2007 |
| JP | 2008141902 A | * | 6/2008 |

* cited by examiner

*Primary Examiner* — Bentsu Ro
*Assistant Examiner* — Thai Dinh
(74) *Attorney, Agent, or Firm* — SOLARIS Intellectual Property Group, PLLC

(57) ABSTRACT

The motor controller includes: a current detection section that detects a current between a battery and an inverter circuit generating a voltage applied to a coil of a motor; an overload determination value output section that outputs an overload determination value used to determine whether or not the motor is overloaded; an overload determination section that compares a current value detected by the current detection section against the overload determination value, and that determines the motor to be overloaded in a case in which the current value detected by the current detection section is the overload determination value or greater; and a forced 500 rpm instruction section that controls the motor rotation speed to 500 rpm, this being a specific speed, in a case in which the overload determination section has determined the motor to be overloaded.

19 Claims, 24 Drawing Sheets

MOTOR CONTROLLER

CROSS-REFERENCE TO RELATED APPLICATION

This application is based on and claims priority under 35 USC 119 from Japanese Patent Application No. 2013-163561 filed on Aug. 6, 2013 and Japanese Patent Application No. 2013-163562 filed on Aug. 6, 2013, which are incorporated by reference herein.

BACKGROUND

1. Technical Field

The present invention relates to a motor controller.

2. Related Art

In motors such as a blower motor employed to convey air in a vehicle air conditioner, overload protection control is performed to stop rotation of the blower motor in cases in which fan rotation is obstructed by a foreign object, such as a fallen leaf that has entered from outside the vehicle, increasing the load on the blower motor. Such overload protection prevents overheating due to overloading of circuits in the blower motor controller and in the coils of the stator of the blower motor.

FIG. 24 is a schematic view illustrating an example of a motor controller that determines motor overload based on a current value between an inverter circuit 40 and the negative electrode of a battery 80. In FIG. 24, a current detection section 94 is provided between the sources of respective inverter FETs 44D, 44E, and 44F and the battery 80. The current detection section 94 includes a shunt resistor 94A, and an amplifier 94B that detects a current value of the shunt resistor 94A and amplifies the detected current value. A signal output from the amplifier 94B is input into an overload determination section 98 and an overcurrent determination section 102 respectively.

The overcurrent determination section 102 compares the signal output from the amplifier 94B against an overcurrent determination value output from an overcurrent determination value output section 100, and the overload determination section 98 compares the signal output from the amplifier 94B against an overload determination value output from the overload determination value output section 96. Signals output from the overcurrent determination section 102 and the overload determination section 98 are input into an OR circuit 130.

The OR circuit 130 outputs a signal to forcibly stop the output of a voltage correction section 68 in a case in which the signal output from the amplifier 94B has been determined to be the overcurrent determination value or higher by the overcurrent determination section 102, or has been determined to be the overload determination value or higher by the overload determination section 98. The rotation of a motor 52 can accordingly be stopped when the circuit has been determined to be in an overloaded state or an overcurrent state, enabling circuit burnout to be prevented.

Vehicle air conditioner air intake systems are provided with filters to prevent the intrusion of foreign objects, however since such filters can create intake resistance, sometimes vehicle air conditioners are employed with the filters removed. Removing the filter from the air intake system increases the airflow of the air conditioner; however, since revolution control maintains the blower motor at the same rotation speed, the blower motor is liable to reach a high torque (high load).

In a blower motor, circuits, for example in the motor controller, are cooled by a portion of the air conveyed by the fan. However, when there is a large change to the airflow of the fan with the air intake system filter in a removed state, it is not possible to guide a portion of the airflow from the fan to cool the circuits, rendering the circuits liable to overheating.

When the load on the blower motor has increased, overload protection control is performed to stop rotation of the blower motor in order to prevent the motor controller from overheating. However, there is an issue that when the air intake system filter has been removed, making the blower motor liable to excessive rotation speed, such overload protection control is performed frequently, and as such, smooth operation of the vehicle air conditioner cannot be anticipated.

Patent Document 1 (Japanese Patent No. 3801015) discloses an overload protection device of a motor drive system that prevents overheating of a circuit by lowering the level of a motor rotation speed instruction signal in cases in which the temperature of a shunt resistor, disposed on a drive power supply path to a motor, has reached a specific temperature.

SUMMARY OF INVENTION

Technical Problem

There is a correlative relationship between the load on a motor and the current supplied to the motor, with the current supplied to the motor increasing as the load on the motor increases. However, in the invention described in Patent Publication 1, since load on the motor is determined by a thermistor detecting heat arising in the shunt resistor due to the current, there is an issue that making determination quickly is more difficult than when the load on the motor is determined by the size of the current supplied to the motor. Moreover, in the invention described in Patent Publication 1, the thermistor is liable to be affected by temperature changes due to current size in the motor coils, with the issue that it is difficult to accurately ascertain an overheated state of a circuit.

In consideration of the above circumstances, an object of the present invention is to provide a motor controller capable of quickly and accurately resolving an overloaded state of a motor and circuit, without stopping rotation of the motor.

Solution to Problem

In order to address the above issues, a motor controller of a first aspect includes: a current detection means that detects a current flowing between a power source and an inverter circuit generating a voltage applied to a coil of a motor; an overload determination value output means that outputs an overload determination value used to determine whether or not the motor is overloaded; an overload determination means that determines the motor to be overloaded in a case in which a current value detected by the current detection means is equal to or greater than the overload determination value; and a rotation speed control means that controls to reduce the motor rotation speed to a specific speed in a case in which the overload determination means has determined the motor to be overloaded.

In the motor controller, the current detection means detects the current between the power source and the inverter circuit. The overload determination means determines whether or not the motor is overloaded by comparing the current detected by the current detection means against the overload determination value, thereby enabling quick and accurate determination to be made in comparison to cases in which a motor is determined to be overloaded by a thermistor that detects heat arising due to current flowing in the circuit.

After making quick and accurate determination of an overloaded state as described above, the motor controller controls the rotation of the motor to the specific rotation speed. This control enables quick and accurate resolution of the overloaded state of the motor and circuits, without stopping rotation of the motor.

A motor controller of a second aspect is the motor controller of the first aspect, further including: a thermistor that has one terminal to which a voltage is applied across a resistor, has another terminal connected to ground, and has a resistance value that changes with temperature; and a connection means that connects together the one terminal of the thermistor and an output terminal of the overload determination value output means, so as to divide the overload determination value voltage with increasing temperature.

In this motor controller, the resistance value of the thermistor changes with circuit temperature, such that the voltage of the overload determination value output from the overload determination value output means is divided to the thermistor side across the connection means. Since the overload determination value, this being the current value output from the overload determination value output means, also decreases with this voltage division, motor overload can be quickly determined based on a lower overload determination value when there is a concern of the circuit overheating.

A third aspect of the invention is the motor controller of the second aspect, further including a resistor connected in parallel with the thermistor.

In this motor controller, the resistor connected in parallel with the thermistor alleviates the thermistor characteristic of the resistance value changing with changes in temperature, thereby suppressing an increase in the resistance value of the thermistor in a low temperature region. The voltage of the overload determination value output from the overload determination value output means therefore more readily divides to the thermistor side across the connection means at a lower temperature than in the motor controller of the second aspect, thereby enabling quick determination of an overloaded state of the motor, pre-empting a temperature increase resulting from circuit overheating.

A fourth aspect of the invention is the motor controller of either the second aspect or the third aspect, wherein: the thermistor has characteristics of a resistance value that decreases with increasing temperature; and the connection means is a resistor with one terminal connected to the one terminal of the thermistor, and another terminal connected to the overload determination value output means.

In this motor controller, the resistance value of the thermistor decreases with increasing circuit temperature, such that the voltage of the overload determination value output from the overload determination value output means is divided across the connection means to the thermistor side. Employing a resistor as the connection means enables a sudden decrease in voltage due to dividing the voltage to be appropriately suppressed. Since the overload determination value, this being the current value output from the overload determination value output means, also decreases due to this appropriately suppressed voltage division, motor overload can be quickly determined based on a lower overload determination value when there is a concern of the circuit overheating.

A fifth aspect of the invention is the motor controller of either the second aspect or the third aspect, wherein: the thermistor has characteristics of a resistance value that decreases with increasing temperature; and the connection means is a temperature variable resistor that has characteristics of a resistance value that decreases with increasing temperature, that is connected to the one terminal of the thermistor and to an output terminal of the overload determination value output means, and that decreases the voltage of the overload determination value output from the output terminal of the overload determination value output means with increasing temperature.

In this motor controller, the resistance values of the temperature variable resistor and the thermistor decrease with increasing circuit temperature, such that the voltage of the overload determination value is divided across the temperature variable resistor. Since the overload determination value, this being the current value output from the overload determination value output means, also decreases, motor overload can be quickly determined based on a lower overload determination value when there is a concern of the circuit overheating.

When there is a concern of the circuit overheating as described above, after quickly determining the motor to be overloaded based on the lower overload determination value, the motor controller controls to rotate the motor at the specific rotation speed when the overload determination means has determined the motor to be overloaded. This control enables quick and accurate resolution of the overloaded state of the motor and circuits, without stopping rotation of the motor.

A motor controller of a sixth aspect is the motor controller of the fifth aspect, further including a resistor connected in parallel with the temperature variable resistor.

In this motor controller, the resistor connected in parallel with the temperature variable resistor alleviates the temperature variable resistor characteristic of the resistance value decreasing with changing temperature, thereby suppressing an increase in the resistance value of the temperature variable resistor in a low temperature region. Change in the voltage of the overload determination value output from the overload determination value output means in a room temperature region is thereby alleviated, enabling accurate performance of product testing of the motor controller in the room temperature region.

A seventh aspect of the invention is the motor controller of either the fifth aspect or the sixth aspect, wherein the temperature variable resistor is a thermistor.

In this motor controller, employing a thermistor, with a resistance value that decreases with increasing circuit temperature, as the temperature variable resistor, divides the voltage of the overload determination value output from the overload determination value output means across the temperature variable resistor as temperature increases. Since the overload determination value, this being the current value output from the overload determination value output means, also decreases, motor overload can be quickly determined based on a lower overload determination value when there is a concern of the circuit overheating.

An eighth aspect of the invention is the motor controller of any one of the first aspect to the seventh aspect, further including: an overcurrent determination value output means that outputs an overcurrent determination value exceeding the overload determination value; and an overcurrent determination means that determines the motor to be in an overcurrent state in a case in which a current value detected by the current detection means is equal to or greater than the overcurrent determination value; and wherein the rotation speed control means stops rotation of the motor for a specific duration in a case in which the overcurrent determination means has determined the motor to be in an overcurrent state.

In this motor controller, when the current detected by the current detection means is the overcurrent determination value, this being a larger value than the overload determination value, or greater, the motor is determined to be in an overcurrent state, this being more critical than the overloaded state. When such determination has been made, the rotation of the motor is stopped for the specific duration, thereby enabling motor and circuit burnout to be prevented.

DETAILED DESCRIPTION

First Exemplary Embodiment

Figure 1:
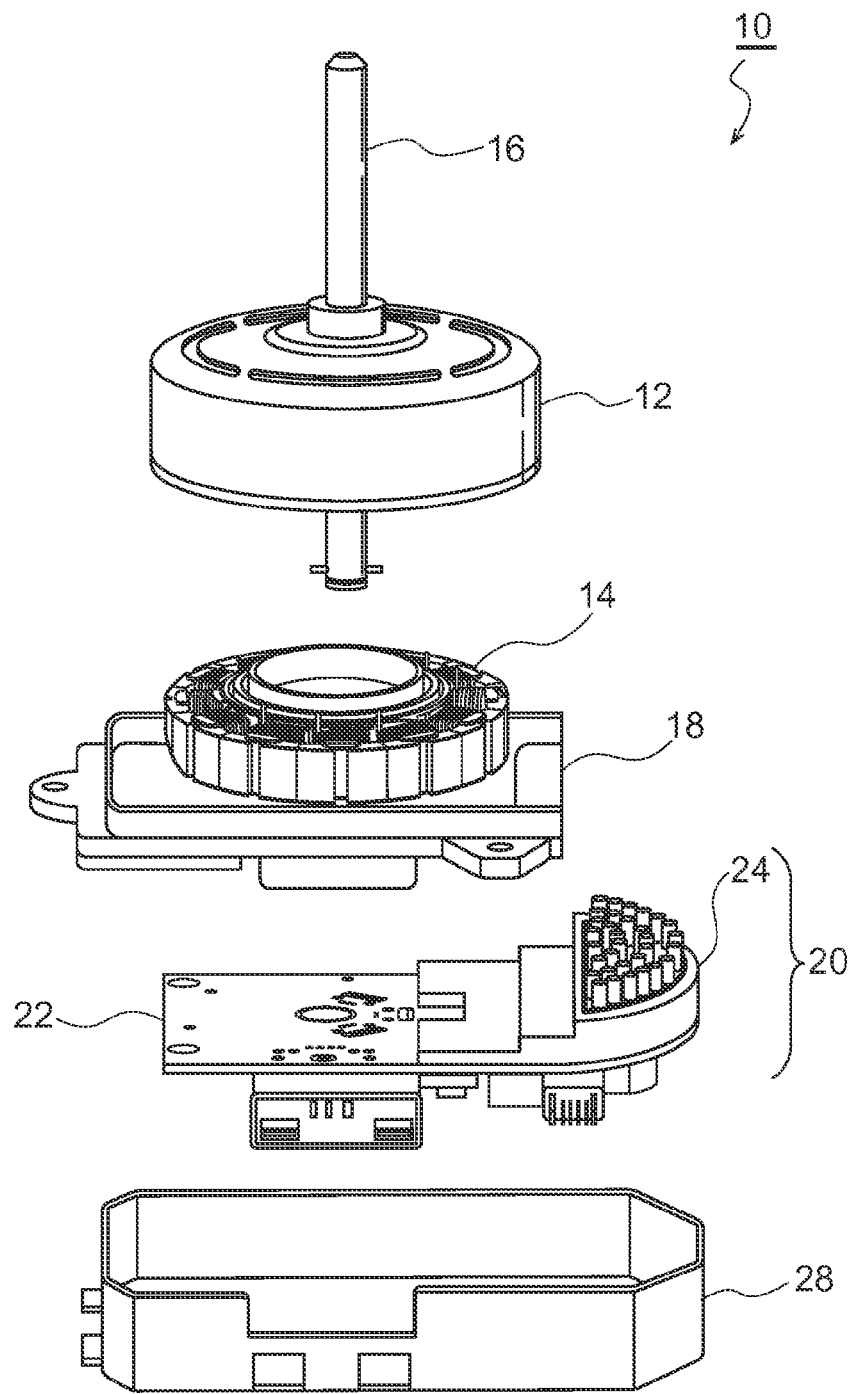
FIG. 1 is a schematic view illustrating a configuration of a motor unit employed in a motor controller according to a first exemplary embodiment of the present invention.

FIG. 1 is a schematic view illustrating a configuration of a motor unit 10 employing a motor controller according to the present exemplary embodiment. The motor unit 10 according to the first exemplary embodiment is, for example, what is known as a blower motor unit, employed to convey air in a vehicle air conditioner.

The motor unit 10 according to the present exemplary embodiment is a three phase motor with an outer rotor structure, with a rotor 12 provided to the outside of a stator 14. The stator 14 is an electromagnet configured by a conductor wound around a core member, and is configured with three phases, namely a U phase, a V phase, and a W phase.

A motor controller 20, described later, controls to switch the polarity of the magnetic field generated by the electromagnet, such that the U phase, the V phase, and the W phase of the stator 14 respectively generate what is known as a rotating magnetic field.

A rotor magnet (not illustrated in the drawings) is provided inside the rotor 12. The rotor magnet rotates the rotor 12 according to the rotating magnetic field generated by the stator 14.

The rotor 12 is provided with a shaft 16 that rotates as a unit with the rotor 12. Although not illustrated in FIG. 1, in the present exemplary embodiment the shaft 16 is provided with a multi-bladed fan, for example what is known as a sirocco fan. The multi-bladed fan rotates together with the shaft 16, enabling air to be conveyed in the vehicle air conditioner.

The stator 14 is attached to the motor controller 20 through an upper case 18. The motor controller 20 includes a circuit board 22 of the motor controller 20, and a heat sink 24 that dissipates heat generated by elements on the circuit board 22.

A lower case 28 is attached to the motor unit 10 configured including the rotor 12, the stator 14, and the motor controller 20.

Figure 2:
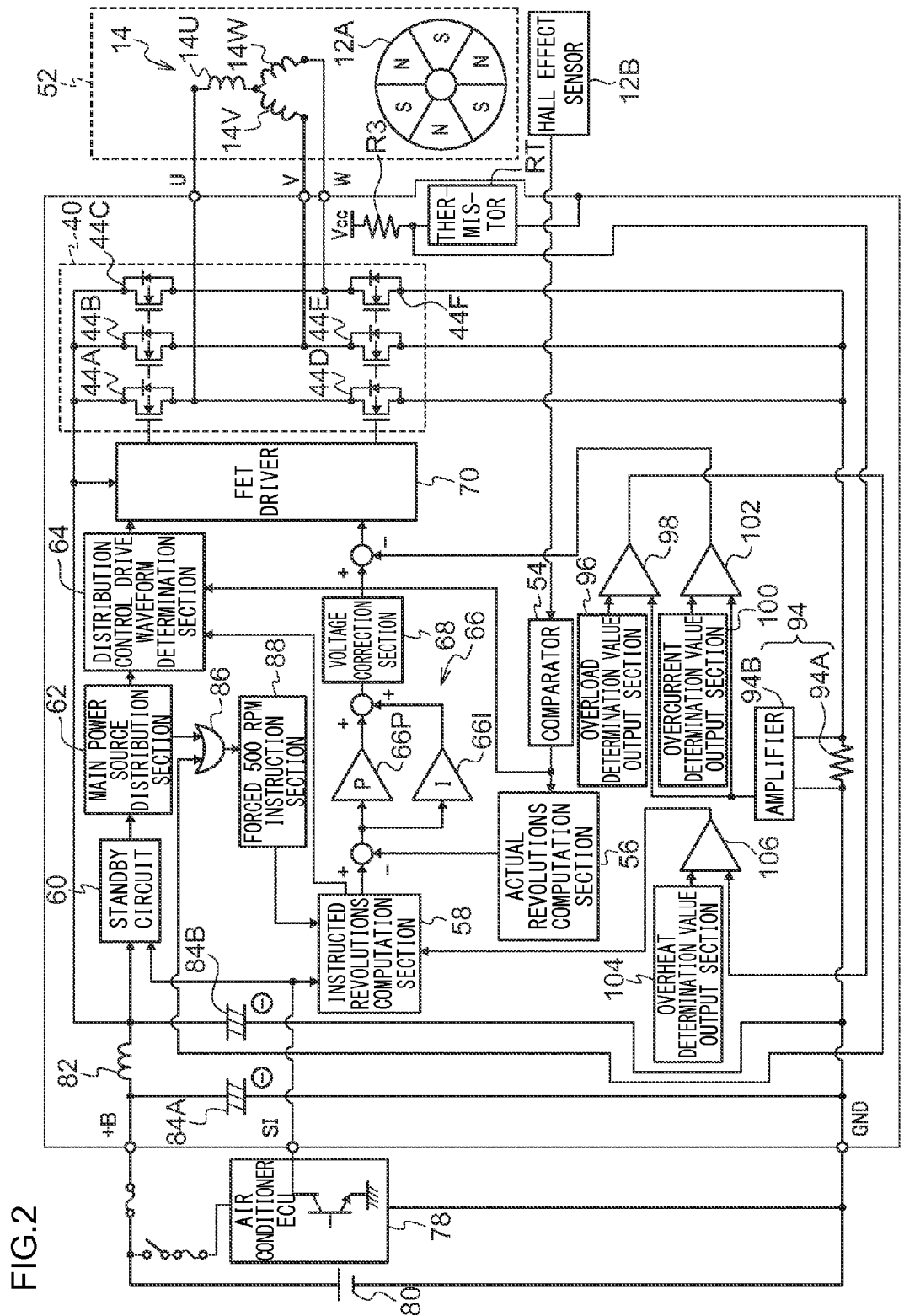
FIG. 2 is a schematic view illustrating a motor controller according to the first exemplary embodiment of the present invention.

FIG. 2 is a schematic view illustrating a motor controller according to the present exemplary embodiment. An inverter circuit 40 illustrated in FIG. 2 uses Field Effect Transistors (FETs) to switch the power supplied to coils of the stator 14 of a motor 52. For example, inverter FETs 44A, 44D, inverter FETs 44B, 44E, and inverter FETs 44C, 44F respectively switch the power supplied to a U phase coil 14U, a V phase coil 14V, and a W phase coil 14W.

The drains of each of the inverter FETs 44A, 44B, 44C are connected to the positive electrode of an on-board battery 80 through a choke coil 82. The sources of each of the inverter FETs 44D, 44E, 44F are connected to the negative electrode of the battery 80.

In addition to the inverter circuit 40, the circuit board of the motor controller 20 of the present exemplary embodiment is also mounted with components including a comparator 54, an actual revolutions computation section 56, an instructed revolutions computation section 58, a standby circuit 60, a main power source distribution section 62, a distribution control drive waveform determination section 64, a PI control section 66, a voltage correction section 68, and a FET driver 70.

The circuit board of the motor controller 20 of the present exemplary embodiment is further mounted with components including the choke coil 82 and smoothing capacitors 84A, 84B. An air conditioner Electronic Control Unit (ECU) 78 and the battery 80 are also connected. Together with the battery 80, the choke coil 82 and the smoothing capacitors 84A, 48B configure a substantially DC power source. The air conditioner ECU 78 is an electronic control unit of the vehicle air conditioner. When a user turns the air conditioner ON using the air conditioner ECU 78, the motor 52 is actuated under control from the motor controller 20. When the user adjusts the airflow rate of the vehicle air conditioner, a signal instructing a rotation speed of the motor 52 (rotor 12) is input through the air conditioner ECU 78.

In the present exemplary embodiment, a Hall effect sensor 12B detects the magnetic field of a sensor magnet 12A that is provided coaxially to the shaft 16. The comparator 54 is a device that converts the analogue output of the Hall effect sensor 12B into a digital signal, and the actual revolutions computation section 56 computes the actual rotation speed of the rotor 12 based on the digital signal output from the comparator 54. The instructed revolutions computation section 58 computes a target rotation speed based on the instruction from the air conditioner ECU 78, for example. In the present exemplary embodiment, the target rotation speed is approximately from 1000 rpm to 5000 rpm.

When, based on the target rotation speed computed by the instructed revolutions computation section 58 and the actual rotation speed computed by the actual revolutions computation section 56, the actual rotation speed is to be changed to the target rotation speed, the PI control section 66 computes a voltage for application to the coils of the stator 14 using what is known as PI control. The PI control section 66 includes a difference proportion section 66P that computes a voltage for the target rotation speed based on a proportional relationship between a difference between the target rotation speed and the actual rotation speed, and a difference between the voltage at the target rotation speed and the voltage at the actual rotation speed. The PI control section 66 also includes an difference integration section 66I that uses difference integration to cancel out residual difference in cases in which a residual difference arises from the proportional relationship alone. The voltage correction section 68 corrects the voltage applied to the coils of the stator 14 based on the computation results of the PI control section 66.

The standby circuit 60 is a circuit that controls power supply from the battery 80 to each respective section. The main power source distribution section 62 turns ON the power source to the motor controller under the control of the standby circuit 60. The main power source distribution section 62 also outputs an instruction through an OR circuit 86 to a forced 500 rpm instruction section 88 at motor 52 start-up, namely when the motor 52 is rotated from a rotation speed of 0 rpm. The forced 500 rpm instruction section 88 controls the instructed revolutions computation section 58 such that the target rotation speed of the motor 52 is 500 rpm for a specific duration on start-up. The instructed revolutions computation section 58 outputs a signal corresponding to 500 rpm to the PI control section 66. Note that the specific duration is, for example, from 500 ms to 1000 ms.

After the specific duration has elapsed, control of the instructed revolutions computation section 58 by the forced 500 rpm instruction section 88 ends, and the instructed revolutions computation section 58 outputs to the PI control section 66 a signal according to the target rotation speed computed based on the instruction from the air conditioner ECU 78.

When supplied with power through the standby circuit 60 and the main power source distribution section 62, the distribution control drive waveform determination section 64 derives the position of the rotor 12 based on the digital signal output from the comparator 54, and determines a drive waveform of the voltage for application to the coils of the stator 14 based on the position of the rotor 12 and the target rotation speed computed by the instructed revolutions computation section 58.

Based on the drive waveform determined by the distribution control drive waveform determination section 64 and a voltage value corrected by the voltage correction section 68, the FET driver 70 generates and outputs to the inverter circuit 40 a PWM signal that controls switching of the inverter circuit 40.

Figure 3:
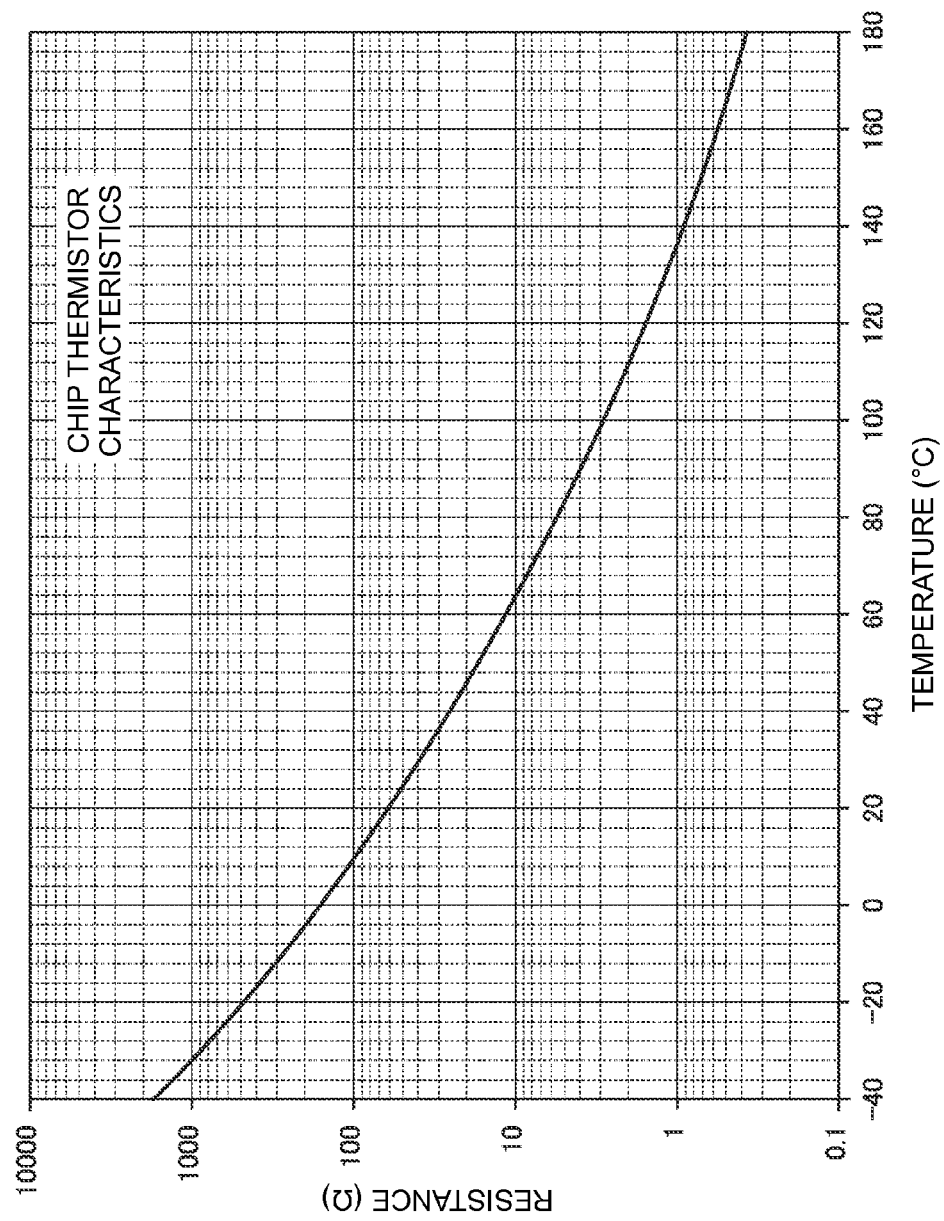
FIG. 3 is a graph illustrating an example of temperature characteristics of a chip thermistor employed in a motor controller according to the first exemplary embodiment of the present invention.

The circuit board of the motor controller 20 according to the present exemplary embodiment is also mounted with a chip thermistor RT that detects the temperature of the circuit board as a resistance value. One terminal of the chip thermistor RT is applied with a control voltage Vcc through a resistor R3, and the other terminal is connected to ground. FIG. 3 illustrates an example of the temperature characteristics of the chip thermistor employed in the motor controller of the present exemplary embodiment. The chip thermistor RT employed in the present exemplary embodiment is a Negative Temperature Coefficient (NTC) thermistor in which resistance decreases with increasing temperature. As illustrated in FIG. 3, the resistance value of the chip thermistor RT decreases with increasing temperature. Note that a Positive Temperature Coefficient (PTC) thermistor in which resistance increases with increasing temperature may be employed in combination with an inverter circuit.

An overheated state determination section 106 compares the resistance value of the chip thermistor RT against an overheat determination value output from an overheat determination value output section 104. When the resistance value of the chip thermistor RT is the overheat determination value or below, the overheated state determination section 106 controls the instructed revolutions computation section 58 to forcibly set the target rotation speed to 0 rpm. As described above, the chip thermistor RT of the present exemplary embodiment is a thermistor in which the resistance value decreases as the temperature increases, and so the circuit is determined to be overheating when the resistance value indicated by the chip thermistor RT is the overheat determination value or below. The overheat determination value varies depending on, for example, the mounting positions of the elements and the chip thermistor RT on the circuit board, and an example thereof is the resistance value of the chip thermistor RT at 145° C.

A current detection section 94 is provided between the sources of the respective inverter FETs 44D, 44E, 44F and the battery 80. The current detection section 94 includes a shunt resistor 94A with a small resistance value in the region of 0.2Ω to several Ω, and an amplifier 94B that detects a current value of the shunt resistor 94A and amplifies the detected current value. A signal output from the amplifier 94B is input into an overload determination section 98 and an overcurrent determination section 102. The overcurrent determination section 102 compares the signal output from the amplifier 94B against an overcurrent determination value output from an overcurrent determination value output section 100. When the signal output from the amplifier 94B is the overcurrent determination value or greater, the overcurrent determination section 102 forcibly stops the output of the voltage correction section 68, thereby stopping rotation of the motor 52. The overload determination section 98 compares the signal output from the amplifier 94B against an overload determination value output from an overload determination value output section 96. When the signal output from the amplifier 94B is the overload determination value or greater, the overload determination section 98 performs control to instruct the forced 500 rpm instruction section 88 through the OR circuit 86, and the rotation speed of the motor 52 is forcibly reduced to 500 rpm, that serves as a specific rotation speed.

In the present exemplary embodiment, the overcurrent determination value is a value exceeding the overload determination value, and is a current value at which rotation of the motor 52 has to be stopped urgently in the interests of circuit protection. The specific values of the overcurrent determination value and the overload determination value depend on the specification of the motor 52, and so the specific values thereof are determined individually for each motor specification through simulations and testing at the design stage. Note that circuits of various configurations may be considered for the overcurrent determination value output section 100 and the overload determination value output section 96, of which one example is a voltage divider circuit such as that illustrated on the right of FIG. 6(1).

After an overcurrent state has been determined and rotation of the motor 52 has been stopped, application of voltage to the coils of the stator 14 is interrupted for a specific duration, thereby preventing circuit burnout. The specific duration is for example 100 ms, with the application of voltage to the coils interrupted for this period of 100 ms. Voltage application is then restarted, and voltage application is once again interrupted if the overcurrent determination value is exceeded. If this repeating state persists for a specific number of times, the risk of circuit burnout is determined to be high, and voltage reapplication is abandoned.

When an overloaded state has been determined and the rotation speed of the motor 52 has been set to 500 rpm, the rotation speed of the motor 52 is controlled at 500 rpm until the current value detected by the current detection section 94 drops below the overload determination value. After the current value detected by the current detection section 94 has dropped below the overload determination value, the voltage applied to the coils of the stator 14 is controlled to rotate the motor 52 at the target rotation speed computed by the instructed revolutions computation section 58.

Figure 4:
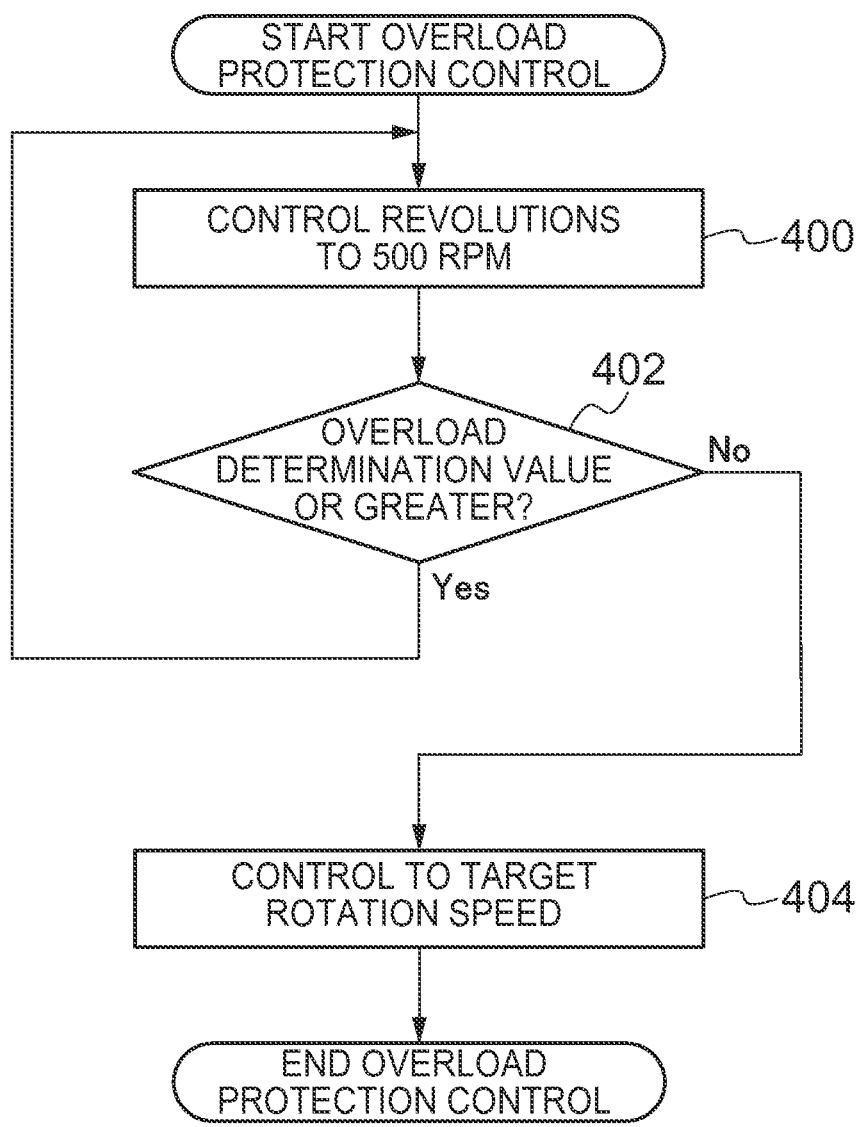
FIG. 4 is a flow chart illustrating overload protection control in a motor controller according to the first exemplary embodiment of the present invention.

FIG. 4 is a flow chart illustrating overload protection control in the motor controller according to the present exemplary embodiment. Overload protection control is started when the overload determination section 98 has determined a current value detected by the current detection section 94 to be the overload determination value or higher, and at step 400, the rotation speed of the motor 52 is controlled to 500 rpm. At step 402, the overload determination section 98 determines whether or not the current detection section 94 has again detected a current value of the overload determination value or higher. Processing returns to step 400 when determination is affirmative, and the rotation speed of the motor 52 continues to be controlled at 500 rpm. When determination is negative at step 402, then at step 404, the rotation speed of the motor 52 is controlled so as to reach the target rotation speed, and overload protection control is ended.

In the present exemplary embodiment, a circuit overcurrent state and a circuit overloaded state are respectively determined according to whether or not the current value detected by the current detection section 94 provided between the inverter circuit 40 and the battery 80 is a specific threshold value or above. The circuit overcurrent state and overloaded state are determined based on the actual measured current value, thereby enabling faster determination to be made than in cases in which a circuit overcurrent state and a circuit overloaded state are determined from a circuit heat generation state.

Moreover, in the present exemplary embodiment, in the overloaded state, in which the circuit current value is not as large as in the overcurrent state, rotation of the motor 52 continues at 500 rpm, this being slower than the target rotation speed, until the overloaded state comes to an end. Operation of the vehicle air conditioner can accordingly continue even in an overloaded state.

Second Exemplary Embodiment

Figure 5:
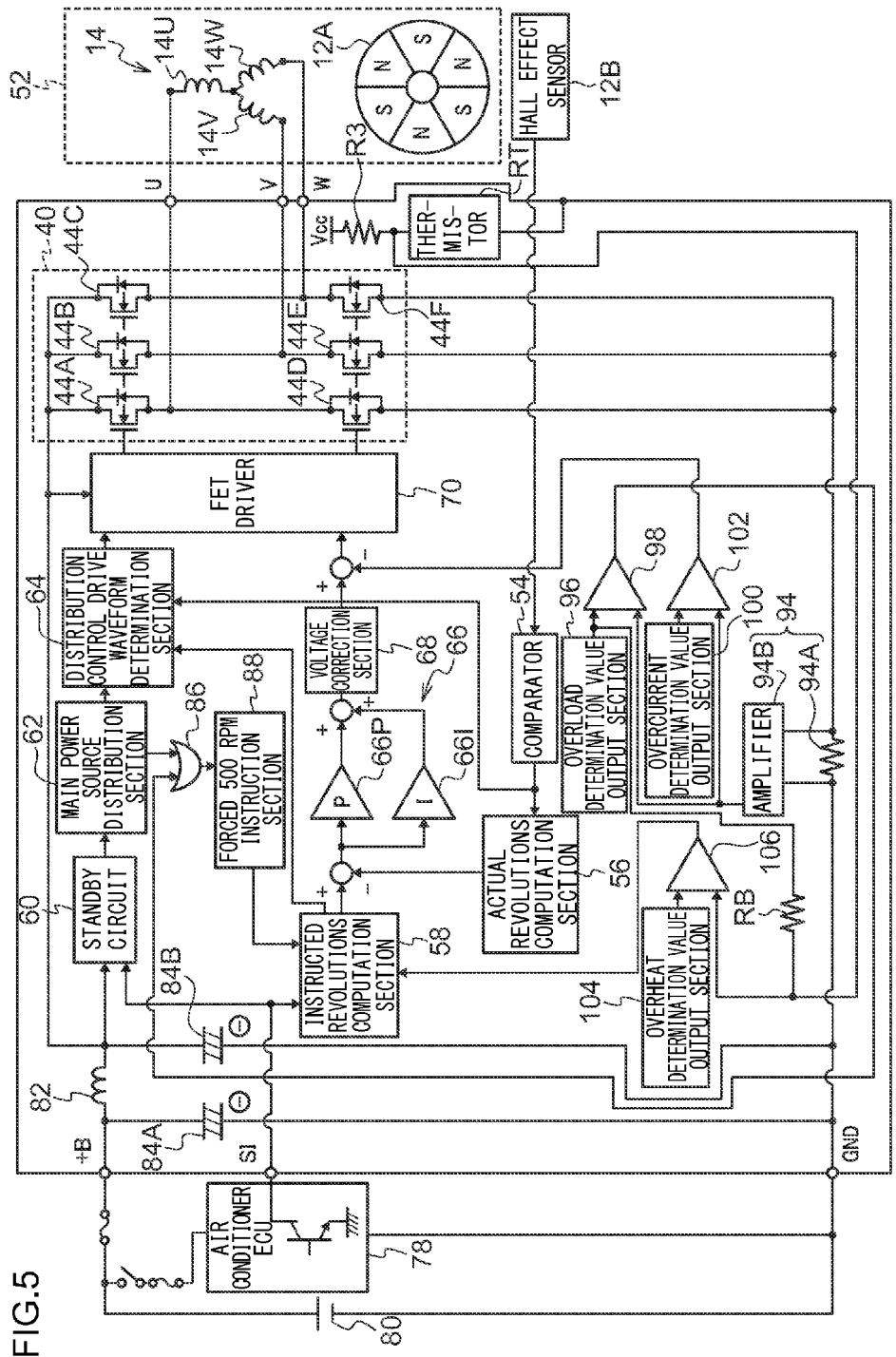
FIG. 5 is a schematic view illustrating a motor controller according to a second exemplary embodiment of the present invention.

FIG. 5 schematically illustrates a motor controller according to a second exemplary embodiment of the present invention. In FIG. 5, configuration the same as in the first exemplary embodiment is allocated the same reference numerals, and detailed explanation regarding configuration the same as in the first exemplary embodiment is omitted. The present exemplary embodiment differs from the first exemplary embodiment in the point that a bridge resistor RB, configuring a bridge circuit, is connected between the terminal of the chip thermistor RT on the side where the resistor R3 is connected (output terminal) and the output terminal of the overload determination value output section 96. A connection means other than the bridge resistor RB, such as a conductor or a diode, may be employed as long as a bridge circuit can be configured.

Figure 6:
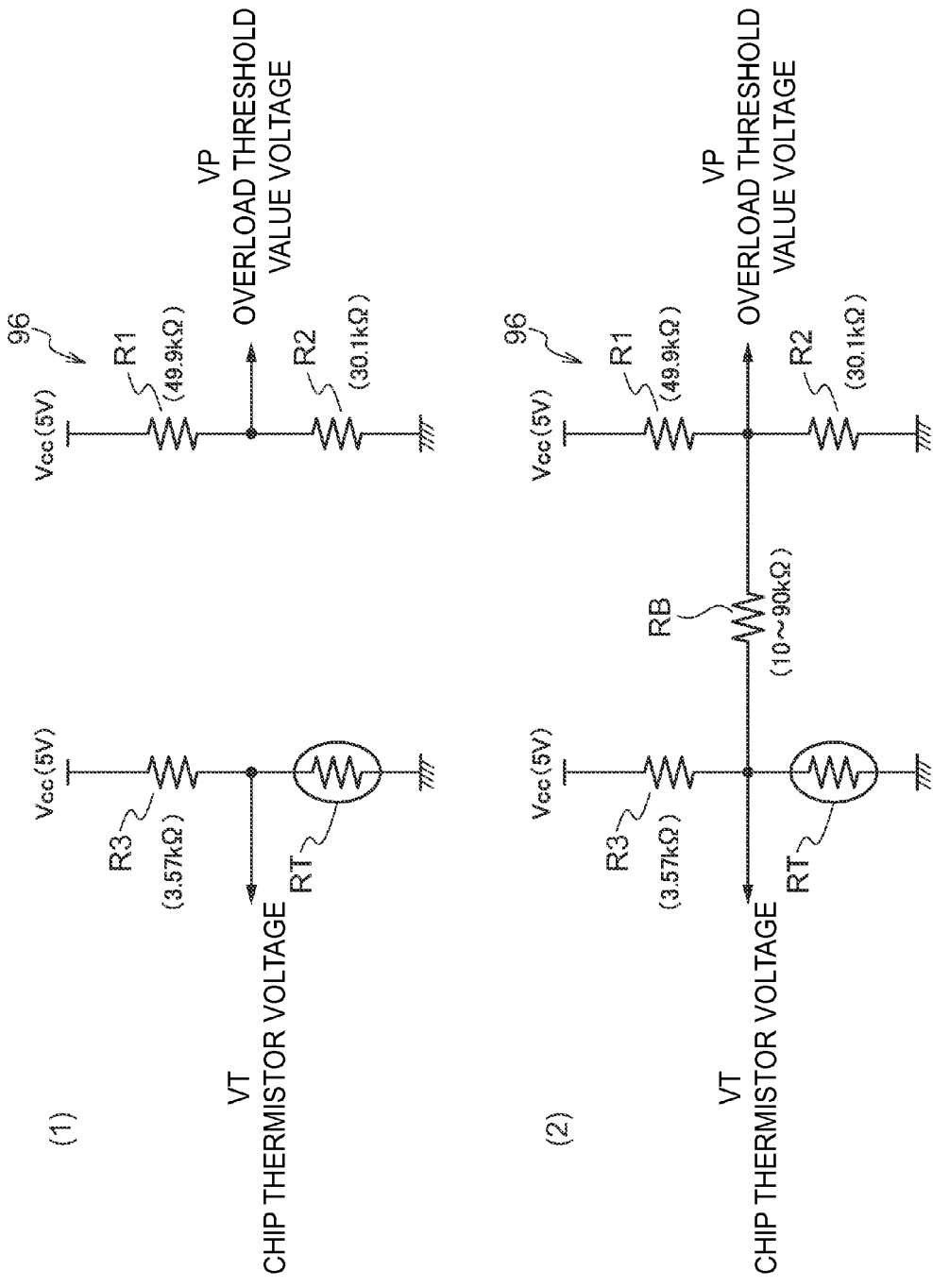
FIG. 6 (1) is a schematic view illustrating a chip thermistor and an overload determination value output section in the first exemplary embodiment, and (2) is a schematic view illustrating a connection between a chip thermistor and an overload determination value output section in the second exemplary embodiment.

FIG. 6(1) is a schematic view illustrating the chip thermistor RT and the overload determination value output section 96 in the first exemplary embodiment. The overload determination value output section 96 is provided with the resistors R1, R2, and configures a voltage divider circuit that outputs the control voltage Vcc as the overload threshold value voltage VP. The chip thermistor RT is a resistor with a resistance value that varies with temperature, and together with the resistor R3, configures a voltage divider circuit that outputs the control voltage Vcc as the chip thermistor voltage VT.

FIG. 6(2) is a schematic view illustrating the connection between the chip thermistor RT and the overload determination value output section 96 in the present exemplary embodiment. The overload determination value output section 96 and the chip thermistor RT respectively configure voltage divider circuits similarly to in the first exemplary embodiment, however in the present exemplary embodiment, both voltage divider circuits are connected together by the bridge resistor RB.

Figure 7:
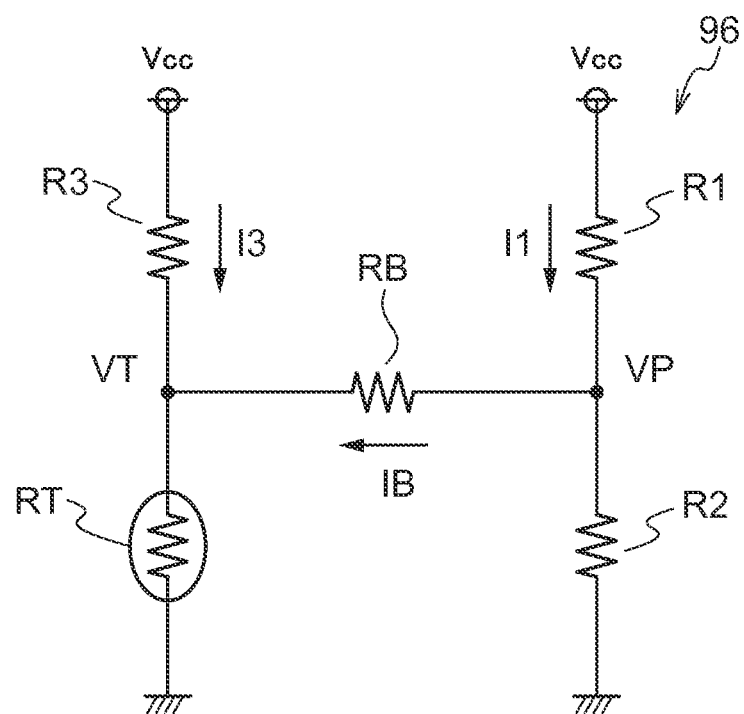
FIG. 7 is a schematic view illustrating a relationship between current values, voltage values, and resistance values in a bridge circuit between a chip thermistor, and an overload determination value output section, according to the second exemplary embodiment of the present invention.

With the exception of the chip thermistor RT, whose resistance value changes with temperature, examples of the resistance values of each of the resistors illustrated in FIG. 6(1) and FIG. 6(2) are given below. The bridge resistor RB is varied in steps in a range of from 10 to 90 k$\Omega$, as described later, and the resistance value best suited to resolving an overload state is selected.
R1: 49.9 k$\Omega$
R2: 30.1 k$\Omega$
R3: 3.57 k$\Omega$
RB: 10 to 90 k$\Omega$ FIG. 7 is a schematic view illustrating relationships between current values, voltage values, and resistance values in the bridge circuit between the chip thermistor RT and the overload determination value output section 96 according to the present exemplary embodiment. The resistance value of the resistor R1 is denoted $R_1$, the resistance value of the resistor R2 is denoted $R_2$, the resistance value of the resistor R3 is denoted $R_3$, the resistance value of the chip thermistor RT is denoted $R_T$, and the resistance value of the bridge resistor RB is denoted $R_B$. When the current value of the current I1 that flows in the resistor R1 is denoted $I_1$, the current value of the current IB that flows in the bridge thermistor RB is denoted $I_B$, the current value of the current I3 that flows in the resistor R3 is denoted $I_3$, a voltage value of the overload threshold value voltage VP is denoted $V_P$, and the voltage value of the chip thermistor voltage VT is denoted $V_T$, the following Equations (1) to (5) can be derived.

$$\begin{cases} V_{CC} - V_P = R_1 I_1 & (1) \\ V_P = R_2(I_1 - I_B) & (2) \\ V_{CC} - V_T = R_3 I_3 & (3) \\ V_P - V_T = R_B I_B & (4) \\ V_T = R_T(I_3 + I_B) & (5) \end{cases}$$

Since from FIG. 7 $I_3=(Vcc-V_T)/R_3$, $I_B=(V_P-V_T)/R_B$, the following Equation (6) can be obtained by substitution of $I_3$ and $I_B$ in Equation (5) above.

$$V_T = \frac{\frac{V_{CC}}{R_3} + \frac{V_P}{R_B}}{\frac{1}{R_3} + \frac{1}{R_T} + \frac{1}{R_B}} \qquad (6)$$

The following Equations (7), (8), can be obtained from Equation (6) and Equations (1) to (4) above.

$$V_P = V_{CC} \cdot \frac{R_2 R_T(R_1 + R_3) + R_2 R_B(R_3 + R_T)}{R_1 R_2(R_3 + R_T) + R_3 R_T(R_1 + R_2) + R_B(R_1 + R_2)(R_3 + R_T)} \qquad (7)$$

$$V_T = V_{CC} \cdot \frac{R_2 R_T(R_1 + R_3) + R_T R_B(R_1 + R_2)}{R_1 R_2(R_3 + R_T) + R_3 R_T(R_1 + R_2) + R_B(R_1 + R_2)(R_3 + R_T)} \qquad (8)$$

Figure 8:
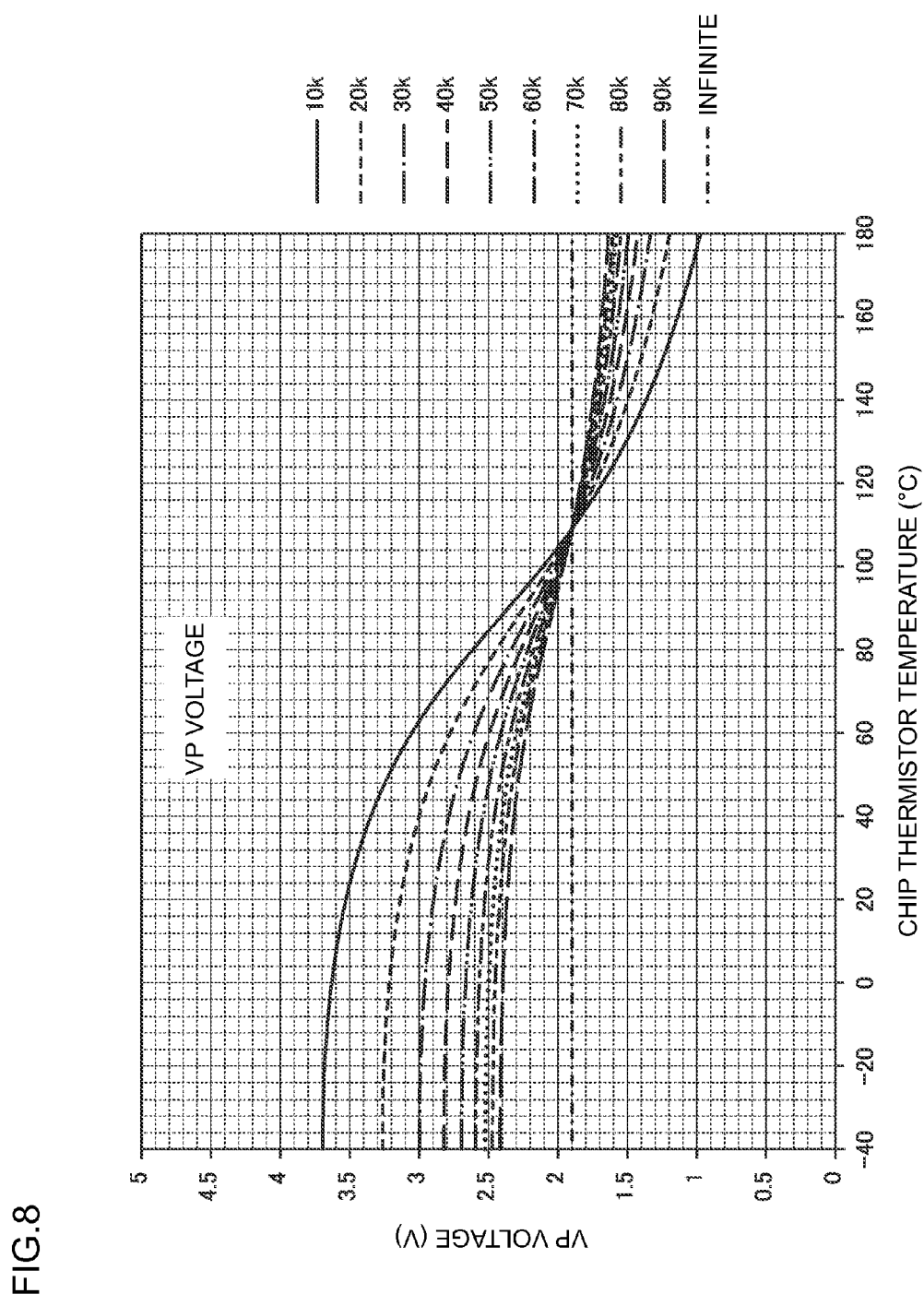
FIG. 8 is a graph illustrating examples of change in an overload threshold value voltage VP corresponding to varying bridge resistor RB resistance values in the second exemplary embodiment of the present invention.

FIG. 8 is a graph illustrating examples of change in the overload threshold value voltage VP corresponding to varying bridge resistor RB resistance values in the present exemplary embodiment. Using Equation (7) above, the overload threshold value voltage VP is calculated for a control voltage Vcc of 5V, with the resistance value of the bridge resistor RB respectively varied through 10, 20 30, 40, 50, 60, 70, 80, and 90 k$\Omega$, as well as for a case with an infinite resistance value in which the bridge resistor RB is not provided.

As illustrated in FIG. 8, the overload threshold value voltage VP becomes higher at lower temperatures of the chip thermistor RT, and becomes lower at higher temperatures of the chip thermistor RT, in comparison to when the bridge resistor RB is not provided. Similarly to in the first exemplary embodiment, the chip thermistor RT provided in the present exemplary embodiment is an NTC thermistor in which resistance decreases with increasing temperature. Accordingly, when the circuit temperature increases and the resistance value of the chip thermistor RT decreases, the voltage of the overload determination value output section 96 is more readily divided to the chip thermistor RT side across the bridge resistor RB, and the overload threshold value voltage VP decreases.

When the overload threshold value voltage VP decreases, the overload determination value, this being a current value, also decreases, thereby enabling faster determination of an overloaded state. In particular, since overload often accompanies circuit overheating, decreasing the overload threshold value voltage VP when the temperature of the chip thermistor RT is high enables faster determination of an overloaded state than in cases in which the overload threshold value voltage VP does not decrease at high temperatures, thereby enabling earlier circuit burnout prevention.

When the present exemplary embodiment is applied to a vehicle air conditioner, the overload threshold value voltage VP is derived for a safe temperature at which circuit burnout and the like do not occur, from the results in FIG. 8 or by testing. Selecting a bridge resistor to give the derived overload threshold value voltage VP or below enables overload determination that prevents circuit burnout. For example, the resistance value of the bridge resistor RB is 20 k$\Omega$ in a case in which the safe temperature at which circuit burnout does not occur is 140° C., and the overload threshold value voltage VP at 140° C. is 1.5V or below.

Figure 9:
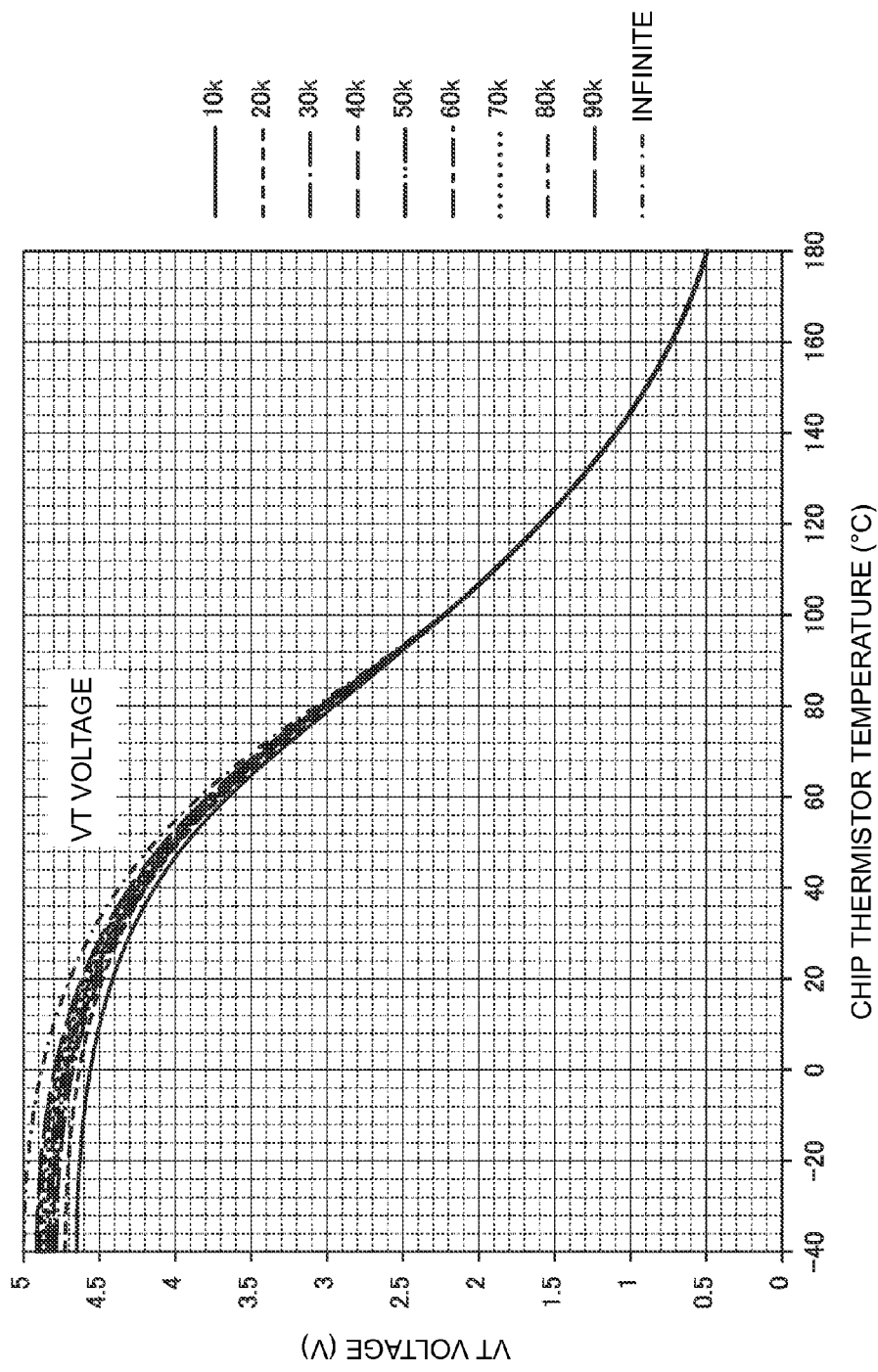
FIG. 9 is a graph illustrating examples of change in a chip thermistor voltage VT corresponding to varying bridge resistor RB resistance values in the second exemplary embodiment of the present invention.

FIG. 9 illustrates examples of change in the chip thermistor voltage VT against corresponding to varying bridge resistor RB resistance values in the present exemplary embodiment, calculated using Equation (8) above. As illustrated in FIG. 9, there is no large change in the value of the chip thermistor voltage VT even when the value of the bridge resistor RB is varied, and so determination of an overheated circuit state by the overheated state determination section 106 is not hindered in the present exemplary embodiment that is configured including a bridge circuit.

As described above, in the present exemplary embodiment, the overload determination value output section 96 and the chip thermistor RT that respectively configure voltage divider circuits are connected together by the bridge resistor RB, thereby exhibiting the advantageous effect of enabling quick determination of an overloaded state when a circuit board that is liable to overloading is at a high temperature.

Third Exemplary Embodiment

Figure 10:
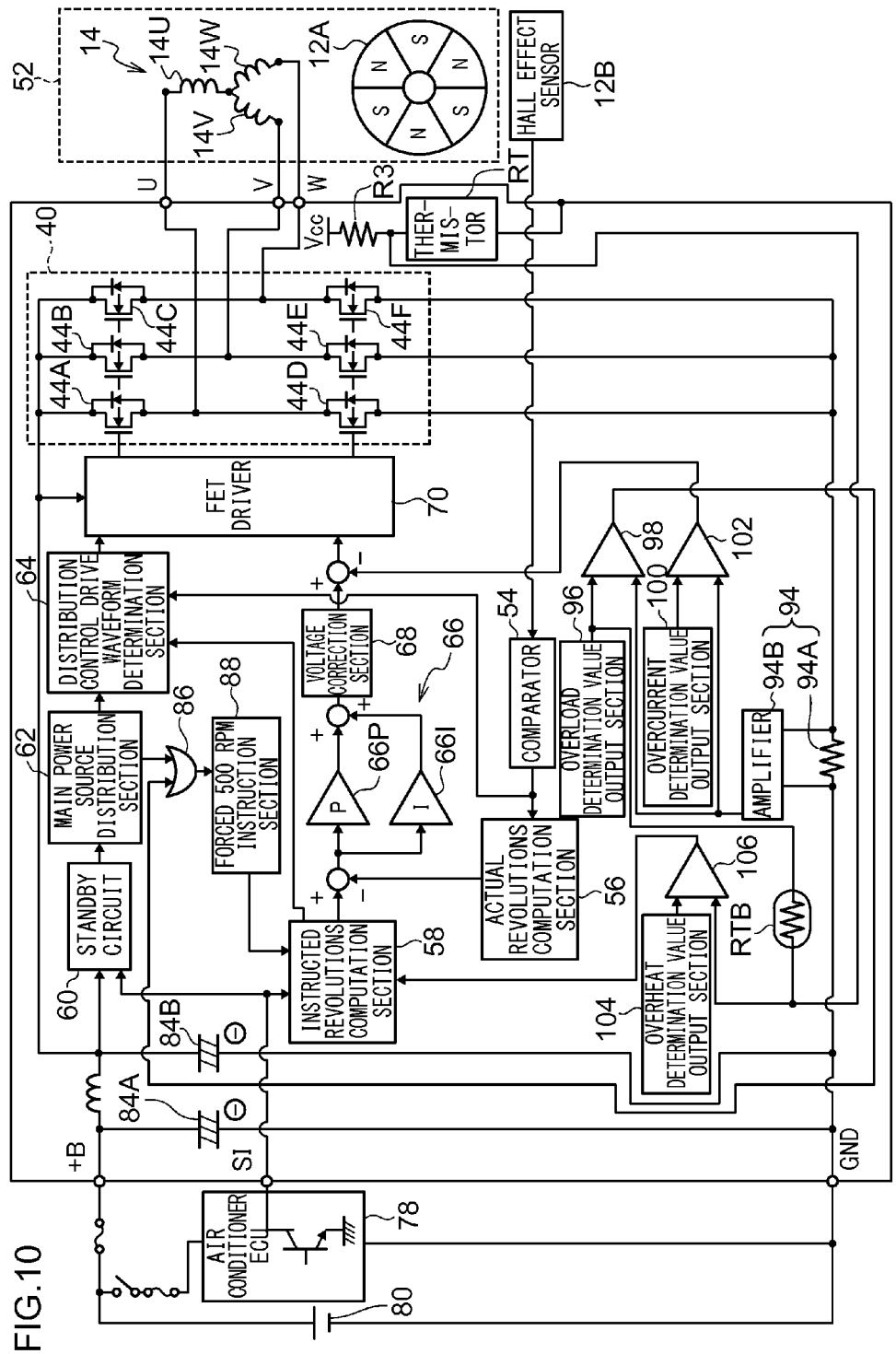
FIG. 10 is a schematic view illustrating a motor controller according to a third exemplary embodiment of the present invention.

FIG. 10 schematically illustrates a motor controller according to a third exemplary embodiment of the present invention. In FIG. 10, configuration the same as in the first and the second exemplary embodiment is allocated the same reference numerals, and detailed explanation regarding configuration the same as in the first or the second exemplary embodiment is omitted. The present exemplary embodiment differs from the second exemplary embodiment in the point that, a bridge thermistor RTB, configuring a bridge circuit, is connected between the terminal of the chip thermistor RT on the side where the resistor R3 is connected (output terminal) and the output terminal of the overload determination value output section 96. The bridge thermistor RTB is an NTC thermistor of the same type as the chip thermistor RT, and has the characteristics illustrated in FIG. 3. Note that an element other than an NTC thermistor may be used as long as it exhibits the characteristic of a decreasing resistance value with increasing temperature.

Figure 11:
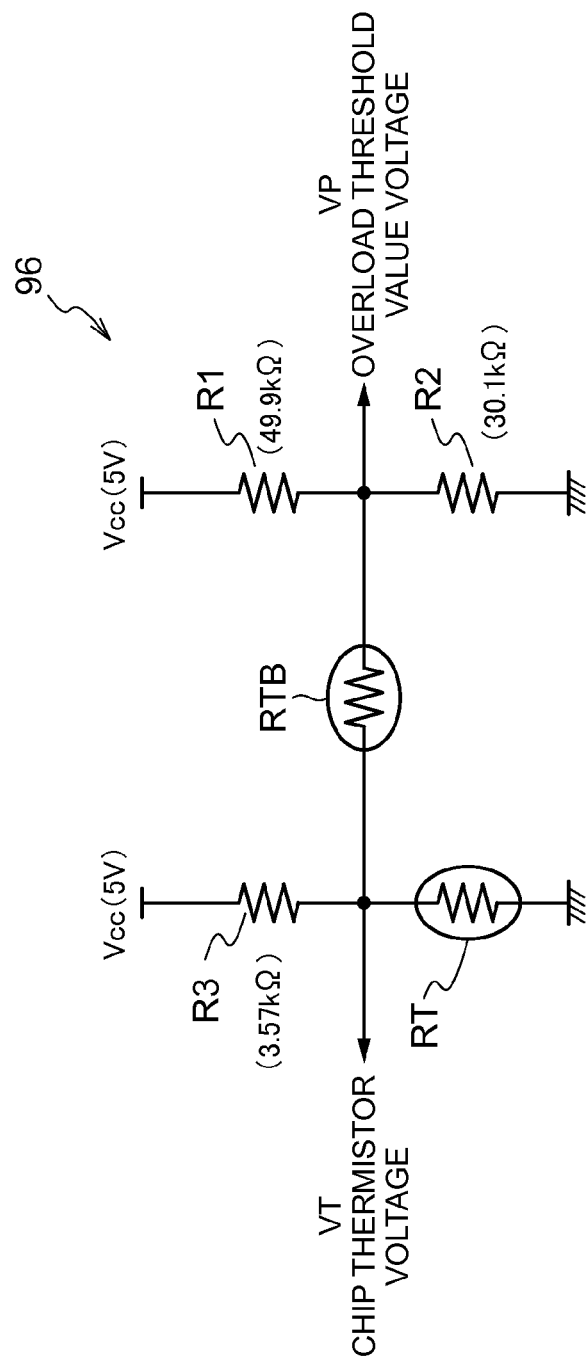
FIG. 11 is a schematic view illustrating a connection between a chip thermistor and an overload determination value output section in the third exemplary embodiment of the present invention.

FIG. 11 is a schematic view illustrating the connection between the chip thermistor RT and the overload determination value output section 96 of the present exemplary embodiment. With the exception of the chip thermistor RT and the bridge thermistor RTB, whose resistance values change with temperature, examples of the resistance values of each of the resistors illustrated in FIG. 11 are given below.
R1: 49.9 kΩ
R2: 30.1 kΩ
R3: 3.57 kΩ

Figure 12:
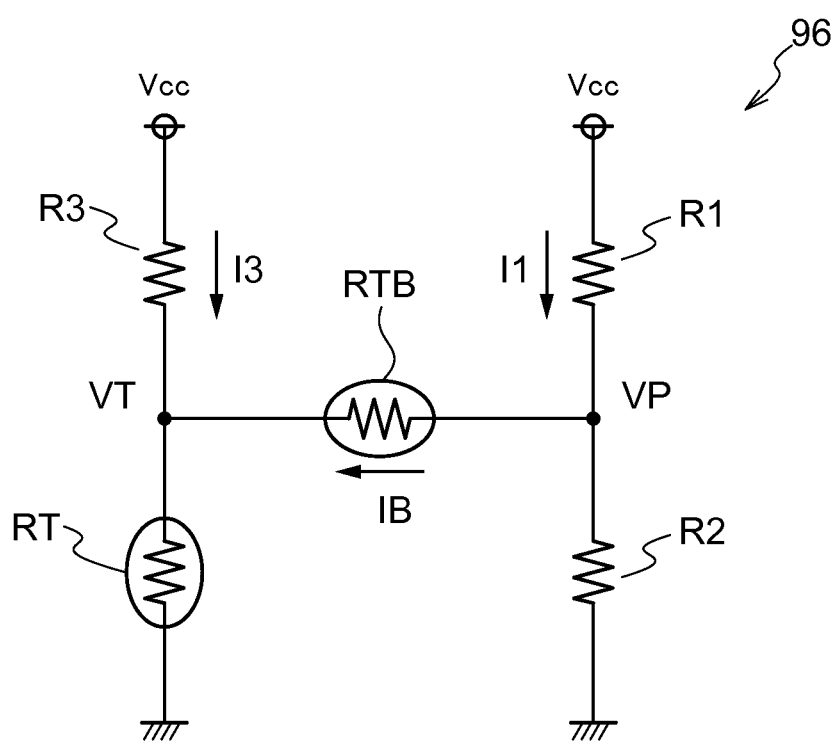
FIG. 12 is a schematic view illustrating a relationship between current values, voltage values, and resistance values in a bridge circuit between a chip thermistor and an overload determination value output section, according to the third exemplary embodiment of the present invention.

FIG. 12 is a schematic view illustrating relationships between current values, voltage values, and resistance values in the bridge circuit between the chip thermistor RT and the overload determination value output section 96 of the present exemplary embodiment. When the bridge thermistor RTB is employed in place of the bridge resistor RB of the second exemplary embodiment such that the resistance value of the bridge thermistor RTB is denoted $R_B$ and the current value of a current IB that flows in the bridge thermistor RTB is denoted $I_B$, the same equations as the Equations (1) to (8), described above, can be derived.

Figure 13:
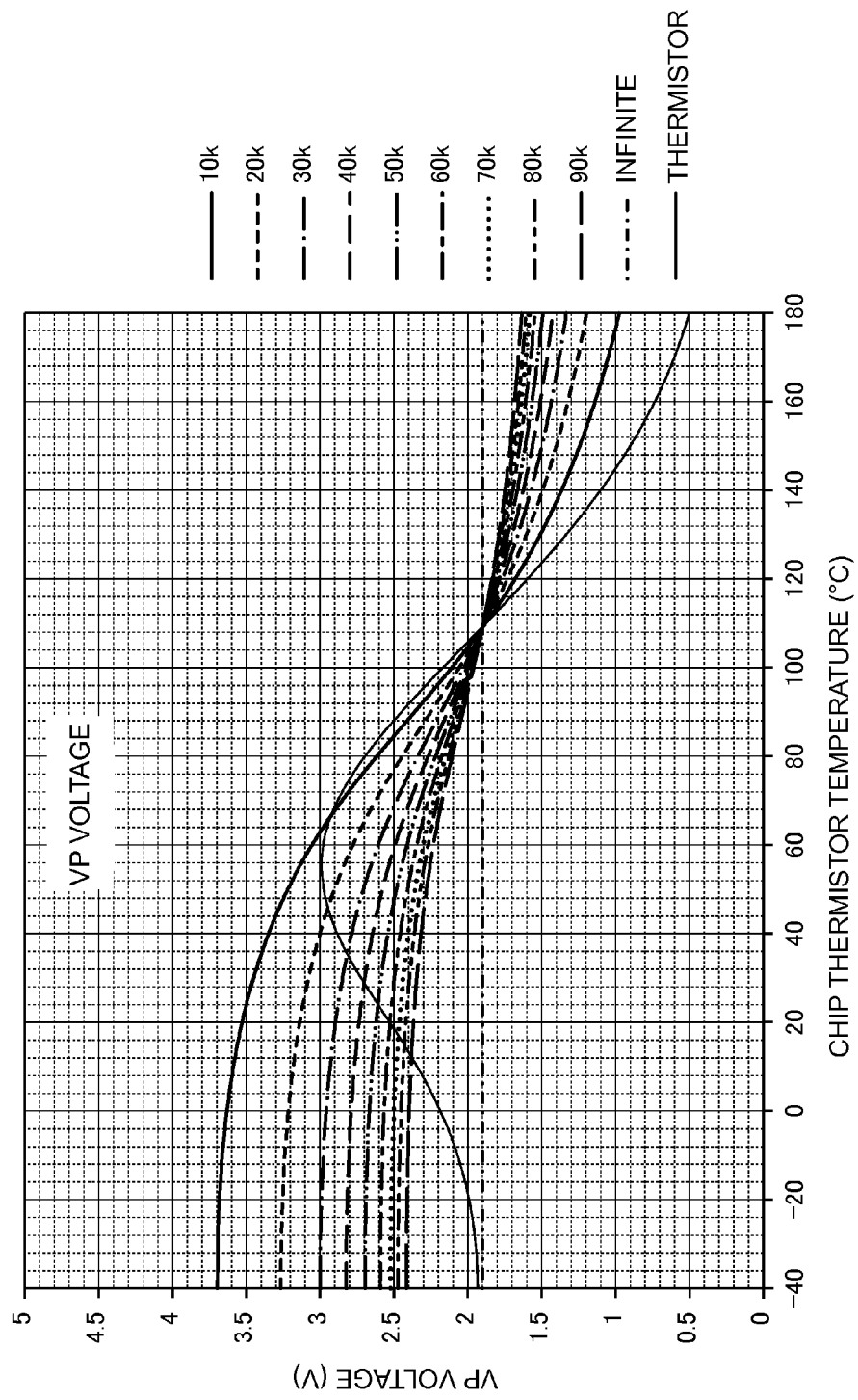
FIG. 13 is a graph illustrating examples of change in an overload threshold value voltage VP with chip thermistor temperature in the third exemplary embodiment of the present invention.

FIG. 13 is a graph illustrating examples of change in the overload threshold value voltage VP with chip thermistor temperature in the present exemplary embodiment. Using Equation (7) above, the overload threshold value voltage VP is calculated for a Vcc of 5V. FIG. 13 also illustrates overload threshold value voltages VP calculated for the second exemplary embodiment in which bridge resistors RB with resistance values of 10, 20, 30, 40, 50, 60, 70, 80, and 90 kΩ, are employed instead of the bridge thermistor RTB, as well as for a case in which a bridge resistor is not employed and the resistance value is infinite.

As illustrated in FIG. 13, when mounted with the bridge thermistor RTB or a bridge resistor, the overload threshold value voltage VP becomes higher at lower temperatures, and the overload threshold value voltage VP becomes lower at higher temperatures, in contrast to when a bridge resistor is not provided and the resistance value is infinite. The chip thermistor RT employed in the present exemplary embodiment is an NTC thermistor in which resistance decreases with increasing temperature. Accordingly, when the circuit temperature increases and the resistance value of the chip thermistor RT falls, the voltage from the overload determination value output section 96 is more readily divided to the chip thermistor RT side across the bridge thermistor RTB or the bridge resistor, and the overload threshold value voltage VP decreases.

When the overload threshold value voltage VP decreases, the overload determination value, this being a current value, also decreases, thereby enabling faster determination of an overloaded state. In particular, since overload often accompanies circuit overheating, decreasing the overload threshold value voltage VP when the temperature of the chip thermistor RT is high enables faster determination of an overloaded state than in cases in which the overload threshold value voltage VP does not decrease at high temperatures, thereby enabling earlier circuit burnout prevention. In particular, when the bridge thermistor RTB is employed in the bridge circuit, voltage division becomes clear and the overload threshold value voltage VP drops rapidly at, and above, an equilibrium temperature, at which the overload threshold value voltage VP is the same as when no resistor is present and the resistance value is infinite, thereby enabling earlier determination of an overloaded state of the motor 52.

Figure 14:
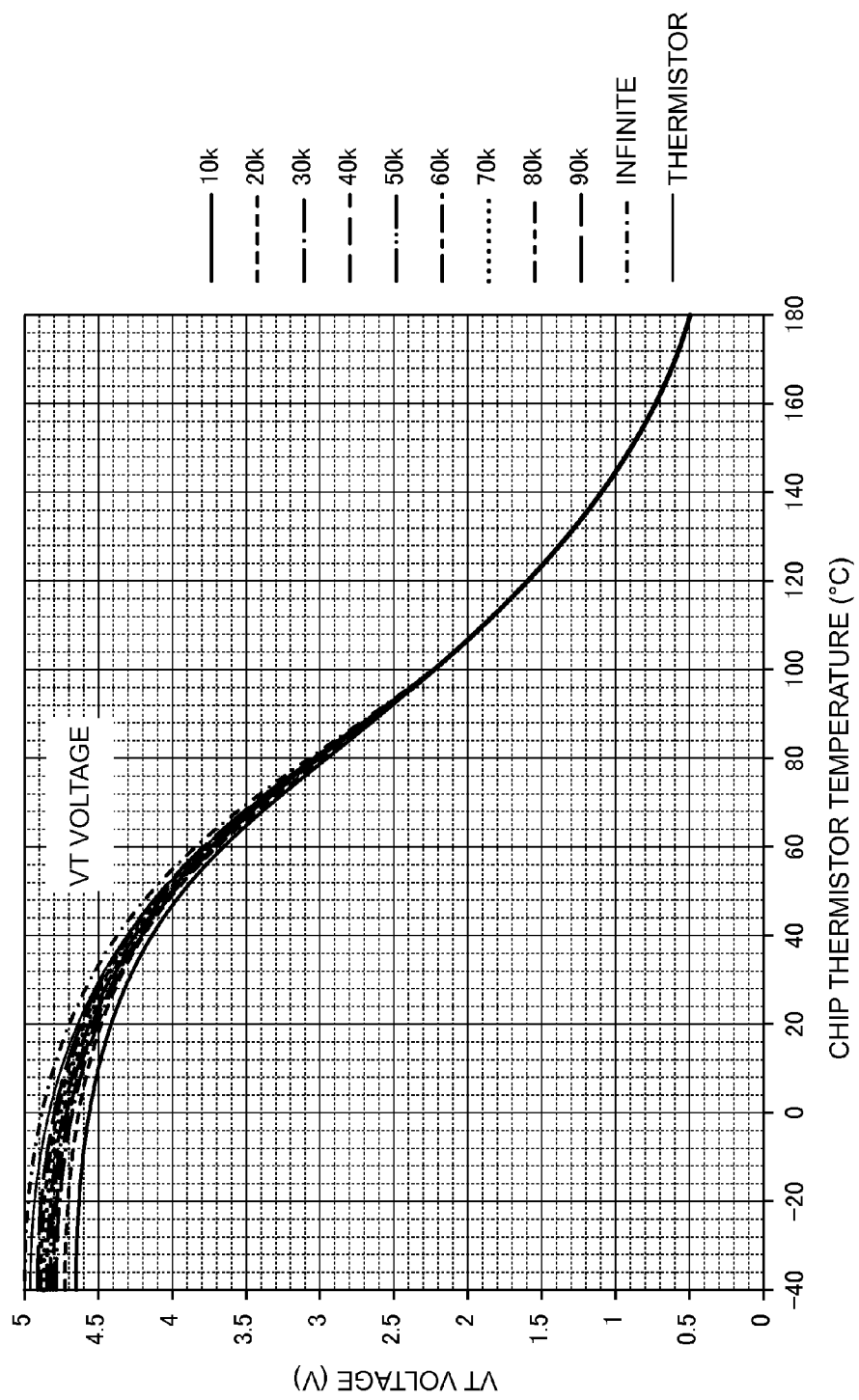
FIG. 14 is a graph illustrating examples of change in a chip thermistor voltage VT with chip thermistor temperature in the third exemplary embodiment of the present invention.

FIG. 14 is a graph illustrating examples of change in the chip thermistor voltage VT with chip thermistor temperature in the present exemplary embodiment, and is calculated using Equation (8) above. As illustrated in FIG. 14, even when the bridge thermistor RTB is provided, and even when the bridge resistor value changes, there is no large change in the value of the chip thermistor voltage VT, and so detection of an overheated circuit state by the overheated state determination section 106 is not hindered in the present exemplary embodiment that is configured including a bridge circuit.

As described above, the bridge thermistor RTB connects together the overload determination value output section 96 and the chip thermistor RT, that respectively configure voltage divider circuits. The present exemplary embodiment accordingly exhibits the advantageous effect of enabling quick determination of an overloaded state when a circuit board that is liable to overloading is at a high temperature.

Fourth Exemplary Embodiment

Figure 15:
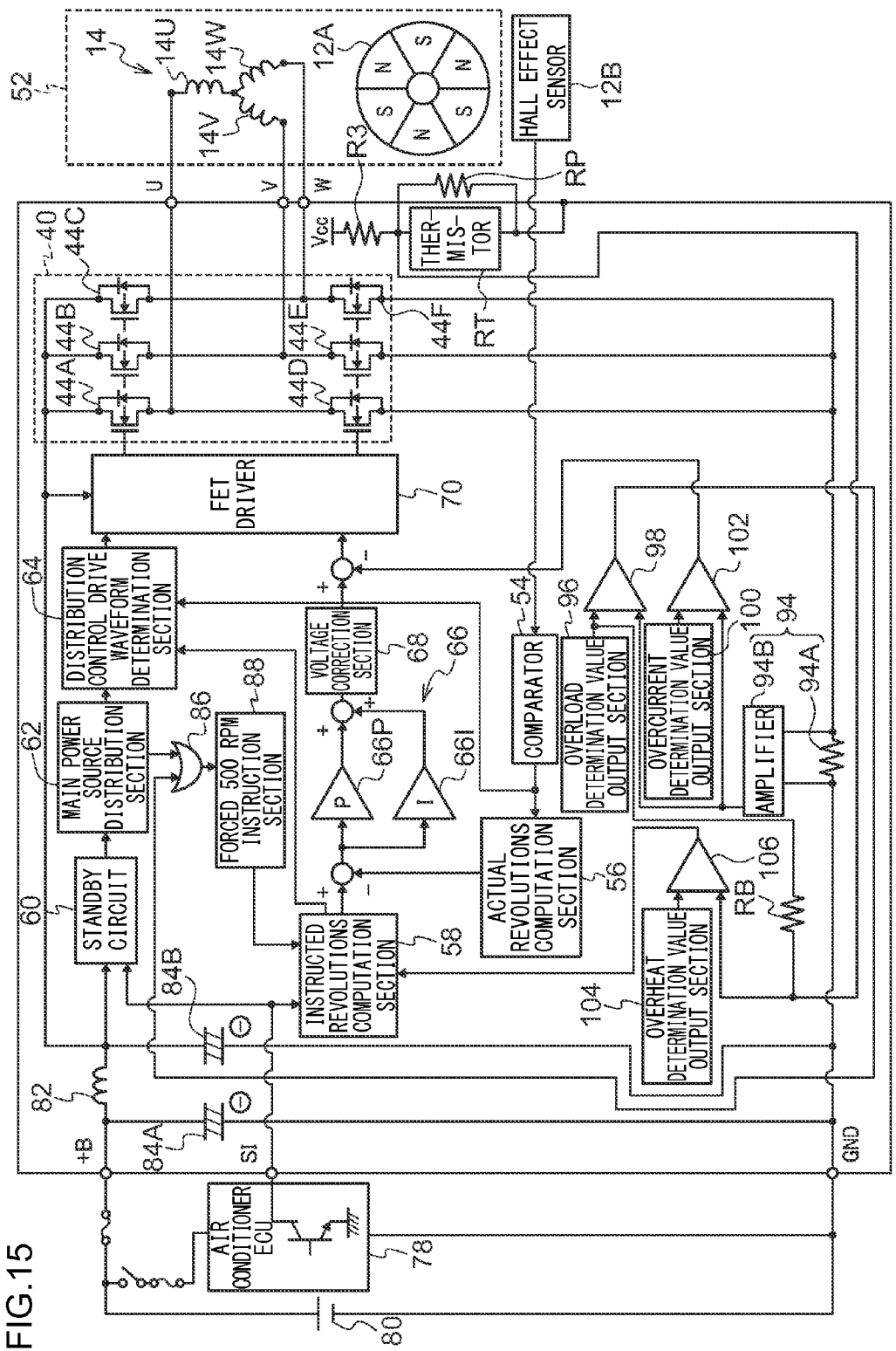
FIG. 15 is a schematic view illustrating a motor controller according to a fourth exemplary embodiment of the present invention.

FIG. 15 schematically illustrates a motor controller according to a fourth exemplary embodiment of the present invention. In FIG. 15, configuration the same as in the first exemplary embodiment and the second exemplary embodiment is allocated the same reference numerals, and detailed explanation regarding configuration the same as in the first exemplary embodiment and the second exemplary embodiment is omitted. The present exemplary embodiment differs from the second exemplary embodiment in the point that a parallel resistor RP is provided to the chip thermistor RT.

Figure 16:
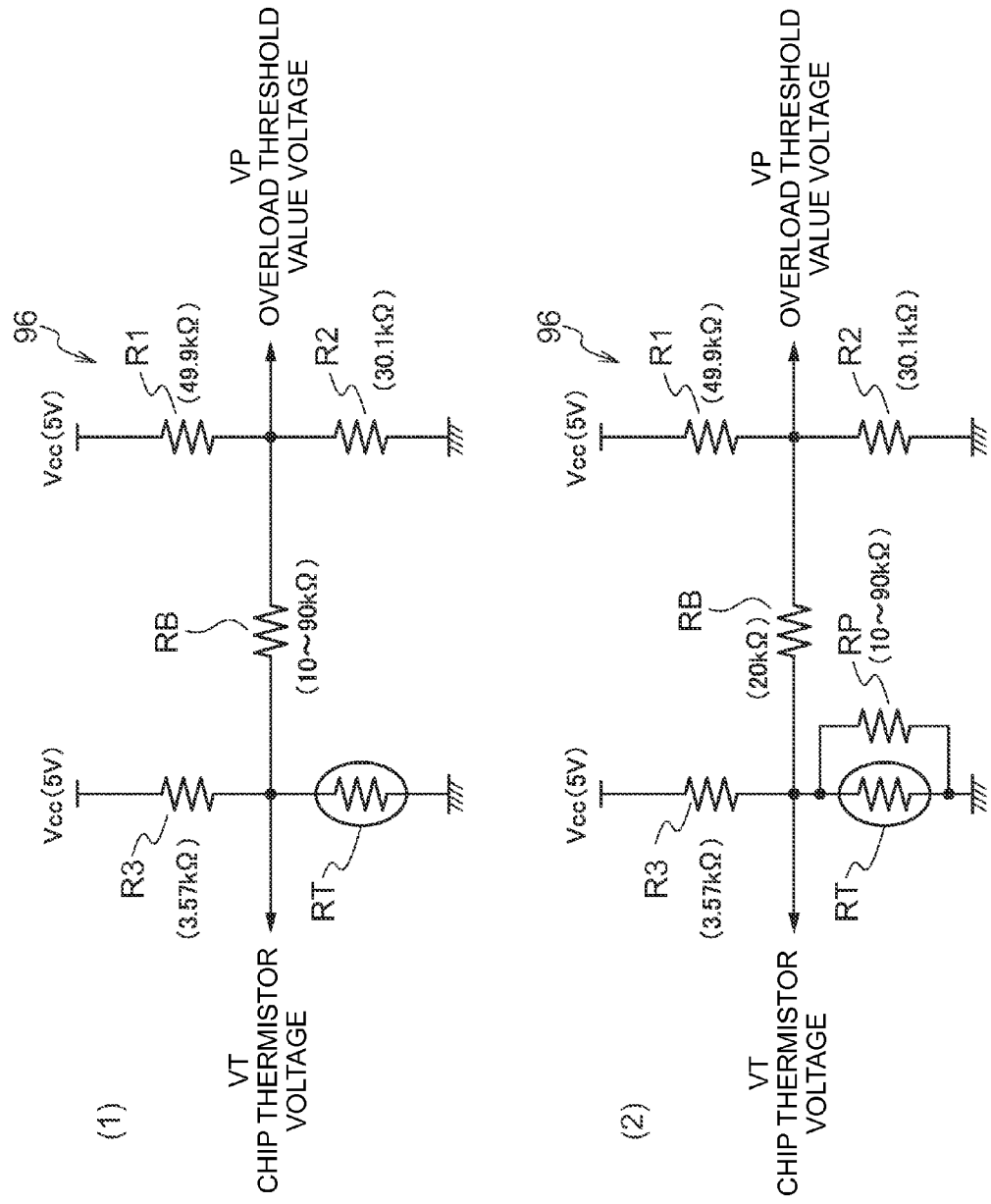
FIG. 16 (1) is a schematic view illustrating a connection between a chip thermistor and an overload determination value output section in the fourth exemplary embodiment, and (2) is a schematic view illustrating a connection between a chip thermistor and an overload determination value output section in the fourth exemplary embodiment.

FIG. 16(1) is a schematic view illustrating the connection between the chip thermistor RT and the overload determination value output section 96 in the second exemplary embodiment. The overload determination value output section 96 and the chip thermistor RT respectively configure voltage divider circuits, with both voltage divider circuits connected together by the bridge thermistor RB. FIG. 16(2) is a schematic view illustrating the connection between the chip thermistor RT and the overload determination value output section 96 in the present exemplary embodiment. Similarly, the overload determination value output section 96 and the chip thermistor RT respectively configure voltage divider circuits, and both voltage divider circuits are connected together by the bridge resistor RB. However, the parallel resistor RP is additionally provided connected parallel with the chip thermistor RT.

The resistance values of each of the resistors in FIG. 16(1) are the same as for those in FIG. 6(2), and so explanation thereof is omitted. With the exception of the chip thermistor RT, whose resistance value changes with temperature, examples of the resistance values of each of the resistors illustrated in FIG. 16(2) are given below. The parallel resistor RP is varied in steps in a range of from 10 to 90 kΩ, as described later, and the resistance value best suited to resolving an overload state is selected.

R1: 49.9 kΩ
R2: 30.1 kΩ
R3: 3.57 kΩ
RB: 20 kΩ
RP: 10 to 90 kΩ

In the present exemplary embodiment, the overload threshold value voltage VP and the chip thermistor voltage VT are computed using the Equations (7), (8) described above, with the bridge thermistor RT and the parallel resistor RP treated as a single combined resistor.

Figure 17:
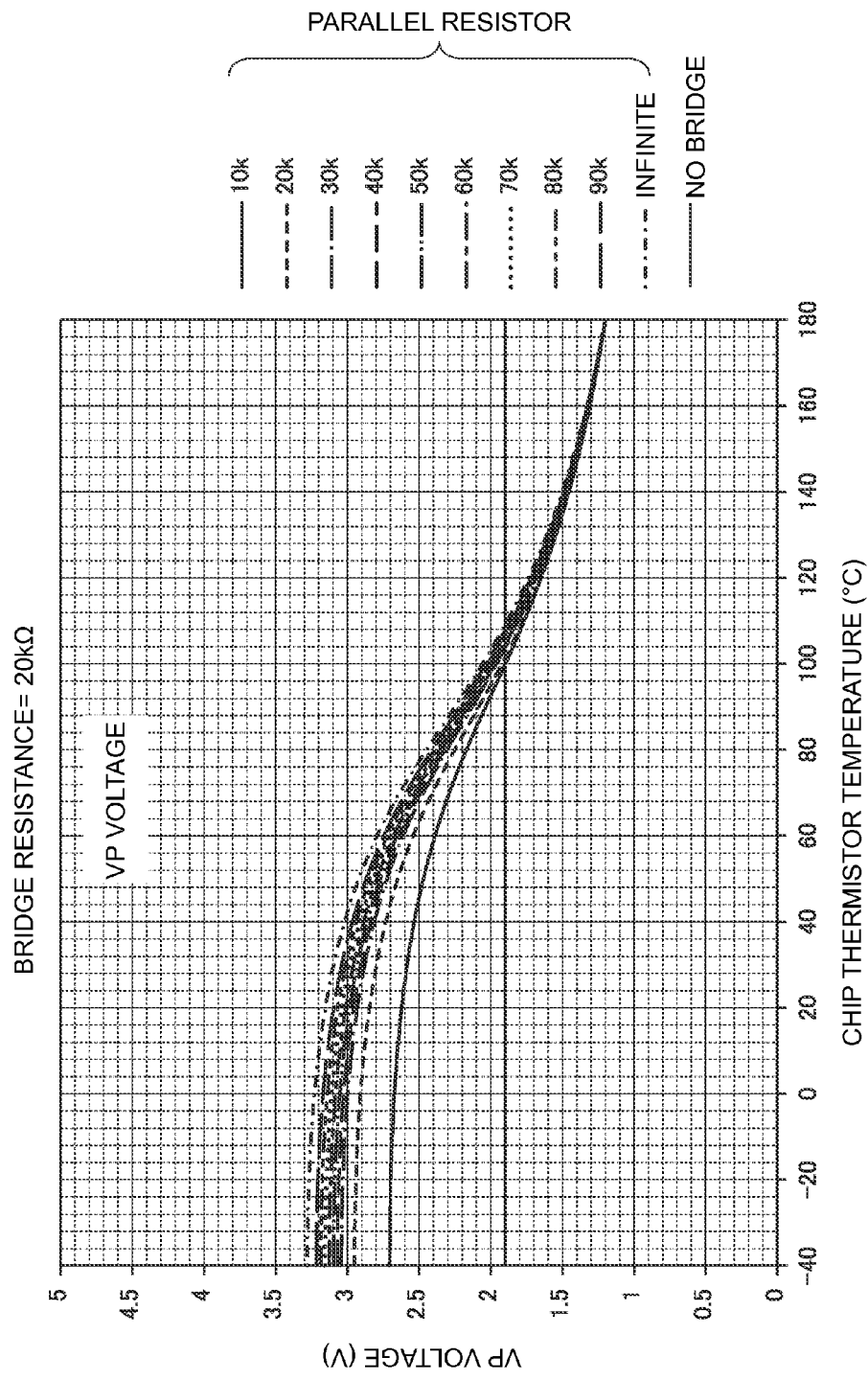
FIG. 17 is a graph illustrating examples of change in an overload threshold value voltage VP corresponding to varying parallel resistor RP resistance values in the fourth exemplary embodiment of the present invention.

FIG. 17 illustrates examples of change in the overload threshold value voltage VP corresponding to varying parallel resistor RP resistance values in the present exemplary embodiment. In FIG. 17, the overload threshold value voltage VP is calculated for a bridge resistor RB resistance value of 20 kΩ, with the resistance value of the parallel resistor RP varied through 10, 20, 30, 40, 50, 60, 70, 80, and 90 kΩ, and for an infinite resistance value in a case in which the parallel resistor RP is not provided. In each case, the overload threshold value voltage VP decreases in the high temperature region more than when the bridge resistor RB is not provided and there is no bridge present. However, the difference between the overload threshold value voltages VP is discernable at the equilibrium temperature, at which the overload threshold value voltage VP is the same as when there is no bridge present, and in the low temperature region of the equilibrium temperature and below. In the present exemplary embodiment, the parallel resistor RP is connected in parallel with the chip thermistor RT, such that the parallel resistor RP suppresses changes in the resistance value of the chip thermistor RT due to temperature. As a result, in the low temperature region of the equilibrium temperature and below, the overload threshold value voltage VP becomes lower than when the parallel resistor RP is not present. In the low temperature region, the overload threshold value voltage VP becomes lower the lower the resistance value of the parallel resistor RP, approaching the overload threshold value voltage VP in the low temperature region for cases in which the bridge resistor RB is not provided.

Providing the bridge resistor RB enables the overload threshold value voltage VP to be decreased in the high temperature region, similarly to in the second exemplary embodiment. However, in the low temperature region, the overload threshold value voltage VP becomes higher than when the bridge resistor RB is not provided, with a concern of hindering overload determination control in the low temperature region. In the present exemplary embodiment, an increase in the overload threshold value voltage VP in the low temperature region of the equilibrium temperature and below is suppressed, thereby enabling concerns of hindering overload determination control in the low temperature region to be reduced.

Figure 18:
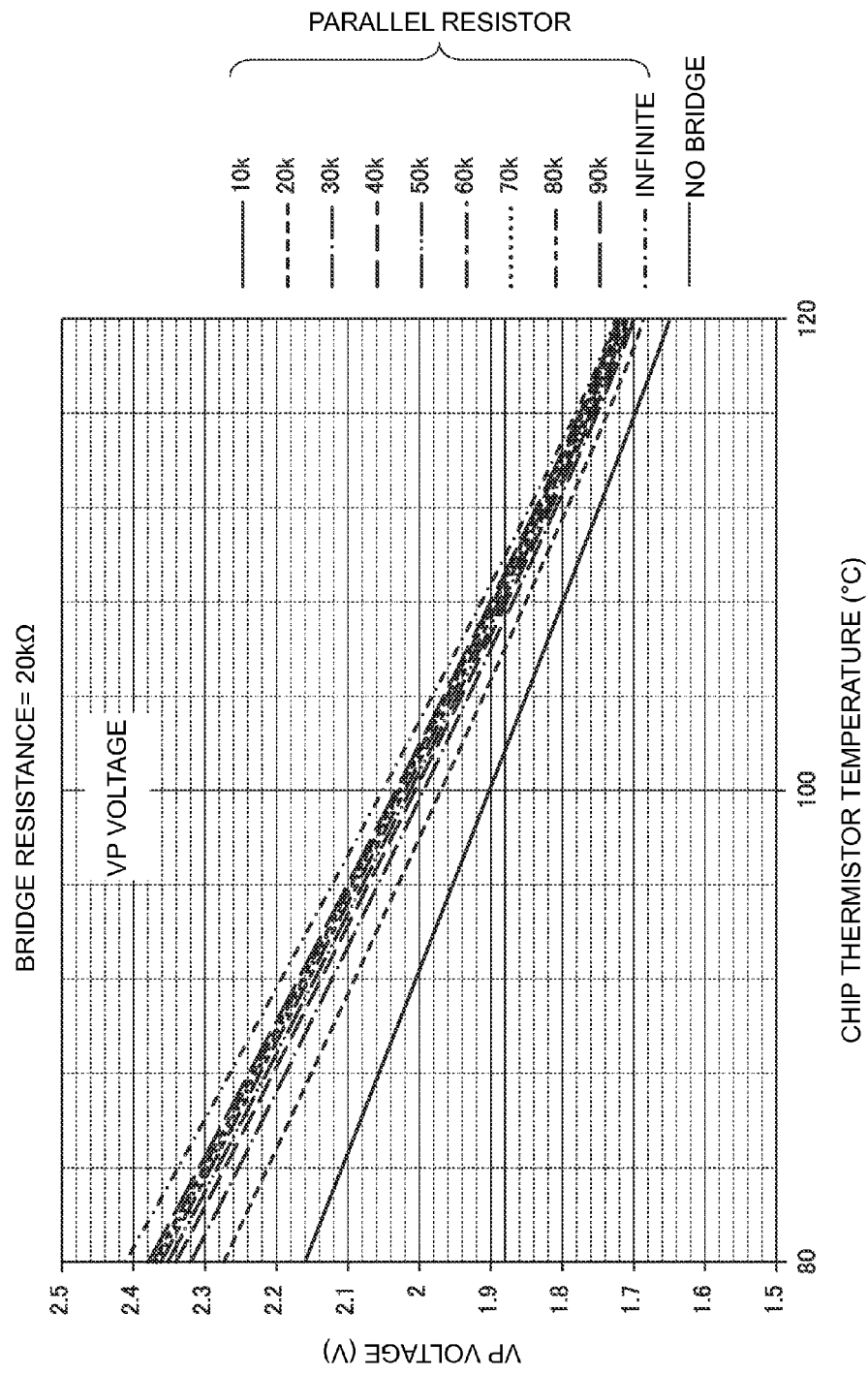
FIG. 18 is an enlargement of the vicinity of an equilibrium temperature in FIG. 16.

The lower the resistance value of the parallel resistor RP, the lower the equilibrium temperature becomes. FIG. 18 illustrates an enlargement of the vicinity of the equilibrium temperature in FIG. 17. In FIG. 18, the equilibrium temperature is 110° C. in the case of an infinite resistance value where the parallel resistor RP is not provided. The equilibrium temperature is 106° C. when a 20 kΩ parallel resistor RP is provided, and the equilibrium temperature is 102° C. when a 10 kΩ parallel resistor RP is provided.

When the bridge resistor RB is provided, irrespective of the presence or absence of the parallel resistor RP, at the equilibrium temperature or above the overload threshold value voltage VP is lower than when no bridge is present. However, the equilibrium temperature can also be reduced by providing the parallel resistor RP. Reducing the equilibrium temperature enables the overload threshold value voltage VP to be reduced further than when there is no bridge present, and moreover from a lower temperature state, thereby enabling quick determination of an overloaded state to pre-empt a temperature increase resulting from circuit overheating.

Figure 19:
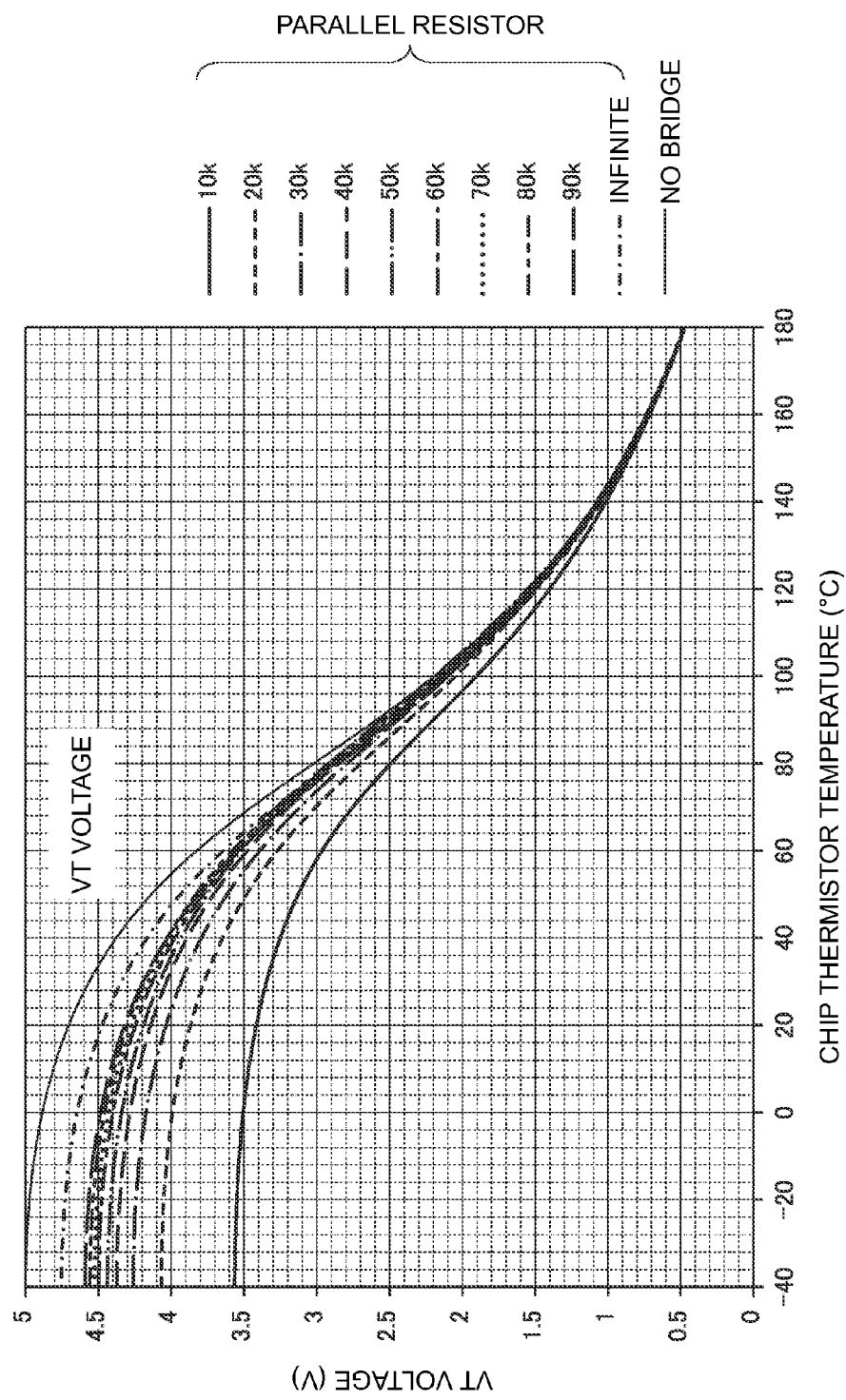
FIG. 19 is a graph illustrating examples of change in a chip thermistor voltage VT corresponding to varying parallel resistor RP resistance values in the fourth exemplary embodiment of the present invention.

FIG. 19 illustrates examples of change in the chip thermistor voltage VT corresponding to varying parallel resistor RP resistance values in the present exemplary embodiment. The chip thermistor voltage VT in the low temperature region decreases when the parallel resistor RP is provided, however since in the present exemplary embodiment, the temperature for determination of an overheated state is set at 145° C., determination of the overheated state of the circuit by the overheated state determination section 106 is not hindered even when the parallel resistor RP is provided.

As described above, in the present exemplary embodiment, the chip thermistor RT is provided with the parallel resistor RP, the parallel resistor RP thereby alleviating the chip thermistor RT characteristic of increasing resistance values in the low temperature region, and suppressing an increase in the overload threshold value voltage VP in the low temperature region. The overload threshold value voltage VP can accordingly be decreased from a lower temperature region than when the parallel resistor RP is not provided, thereby enabling quick determination of an overloaded state, pre-empting a temperature increase resulting from circuit overheating.

Fifth Exemplary Embodiment

Figure 20:
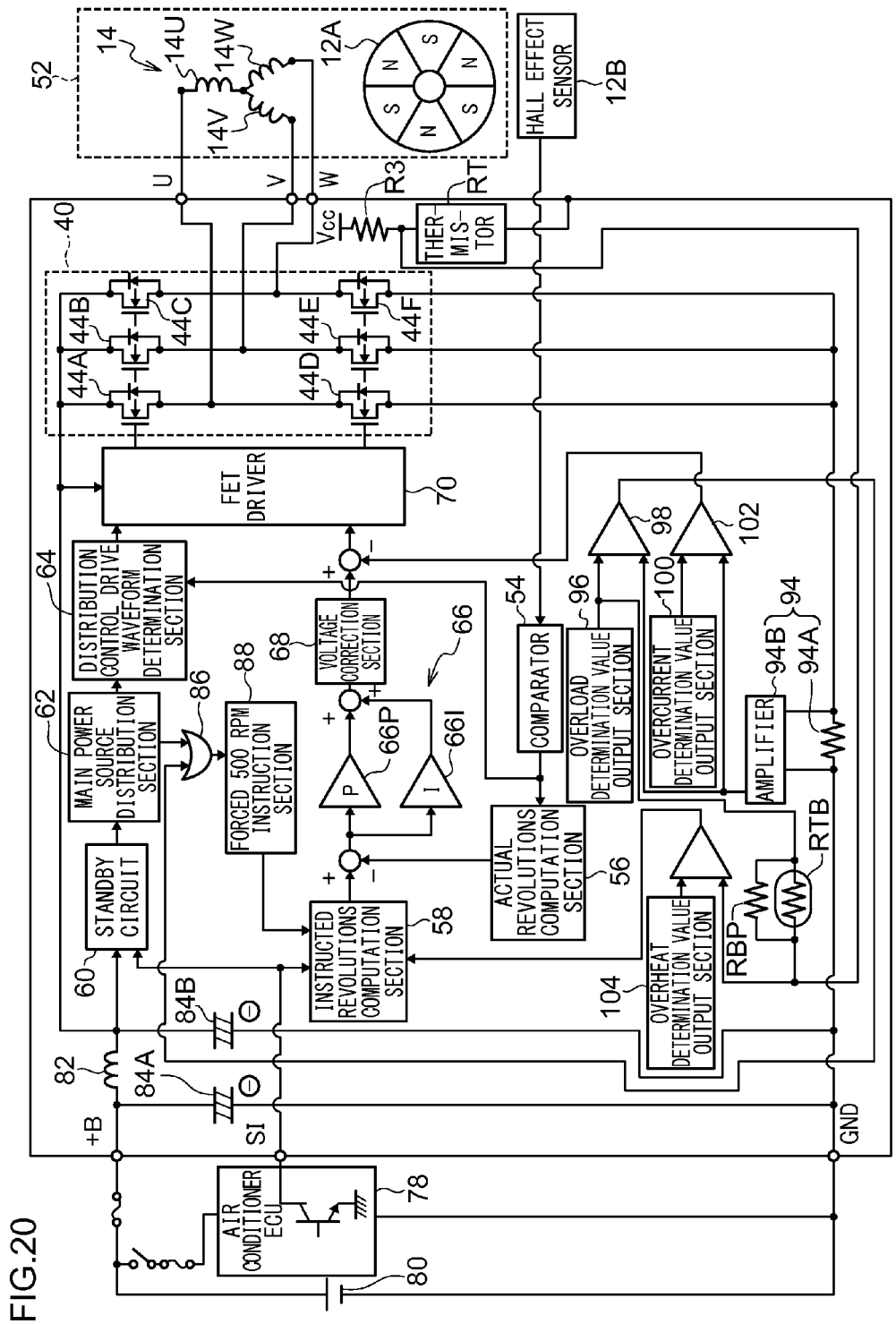
FIG. 20 is a schematic view illustrating a motor controller according to a fifth exemplary embodiment of the present invention.

FIG. 20 schematically illustrates a motor controller according to a fifth exemplary embodiment of the present invention. In FIG. 20, configuration the same as in the third exemplary embodiment is allocated the same reference numerals, and detailed explanation regarding configuration the same as in third exemplary embodiment is omitted. The present exemplary embodiment differs from the third exemplary embodiment in the point that the bridge thermistor RTB is provided with a parallel resistor RBP.

Figure 21:
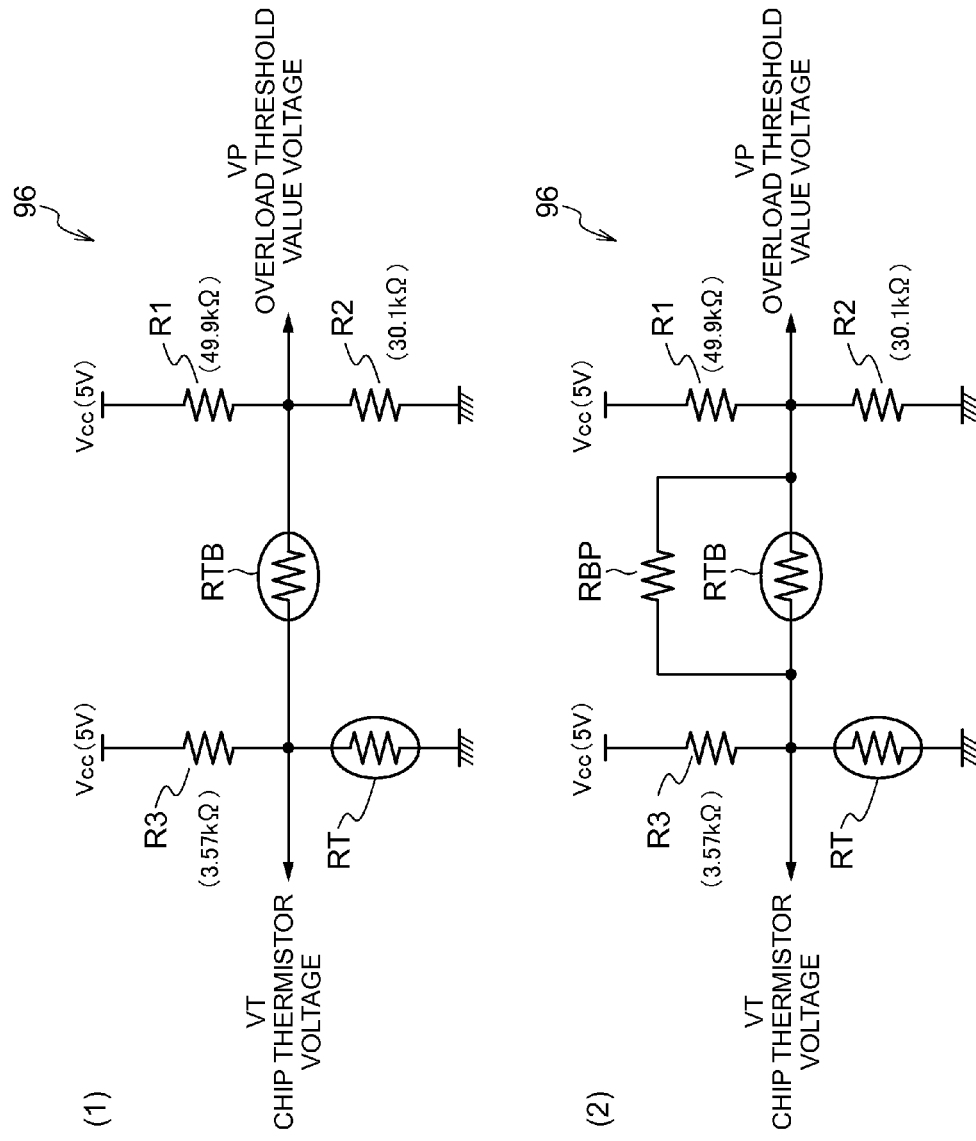
FIG. 21 (1) is a schematic view illustrating a connection between a chip thermistor and an overload determination value output section in the third exemplary embodiment, and (2) is a schematic view illustrating a connection between a chip thermistor and an overload determination value output section in the fifth exemplary embodiment.

FIG. 21(1) is a schematic view illustrating the connection between the chip thermistor RT and the overload determination value output section 96 in the fifth exemplary embodiment. The overload determination value output section 96 and the chip thermistor RT respectively configure voltage divider circuits, with both voltage divider circuits connected together by the bridge thermistor RTB. FIG. 21(2) is a schematic view illustrating the connection between the chip thermistor RT and the overload determination value output section 96 in the present exemplary embodiment. The overload determination value output section 96 and the chip thermistor RT respectively configure voltage divider circuits, and both voltage divider circuits are similarly connected together by the bridge thermistor RTB. However, the parallel resistor RBP is additionally provided connected parallel with the bridge thermistor RTB.

The resistance values of each of the resistors in FIG. 21(1) are the same as for those in FIG. 11, and so explanation thereof is omitted. With the exception of the chip thermistor RT and the bridge thermistor RTB, whose resistance values change with temperature, examples of resistance values of each of the resistors in FIG. 21(2) are given below. Moreover, the parallel resistor RBP is varied in steps in a range of from 1 kΩ to 40 kΩ, as described later, and the resistance value best suited to resolving an overload state is selected.
R1: 49.9 kΩ
R2: 30.1 kΩ
R3: 3.57 kΩ
RBP: 1 to 40 kΩ

In the present exemplary embodiment, the overload threshold value voltage VP and the chip thermistor voltage VT are computed using the Equations (7), (8) described above, with the bridge thermistor RTB and the parallel resistor RBP treated as a single combined resistor.

Figure 22:
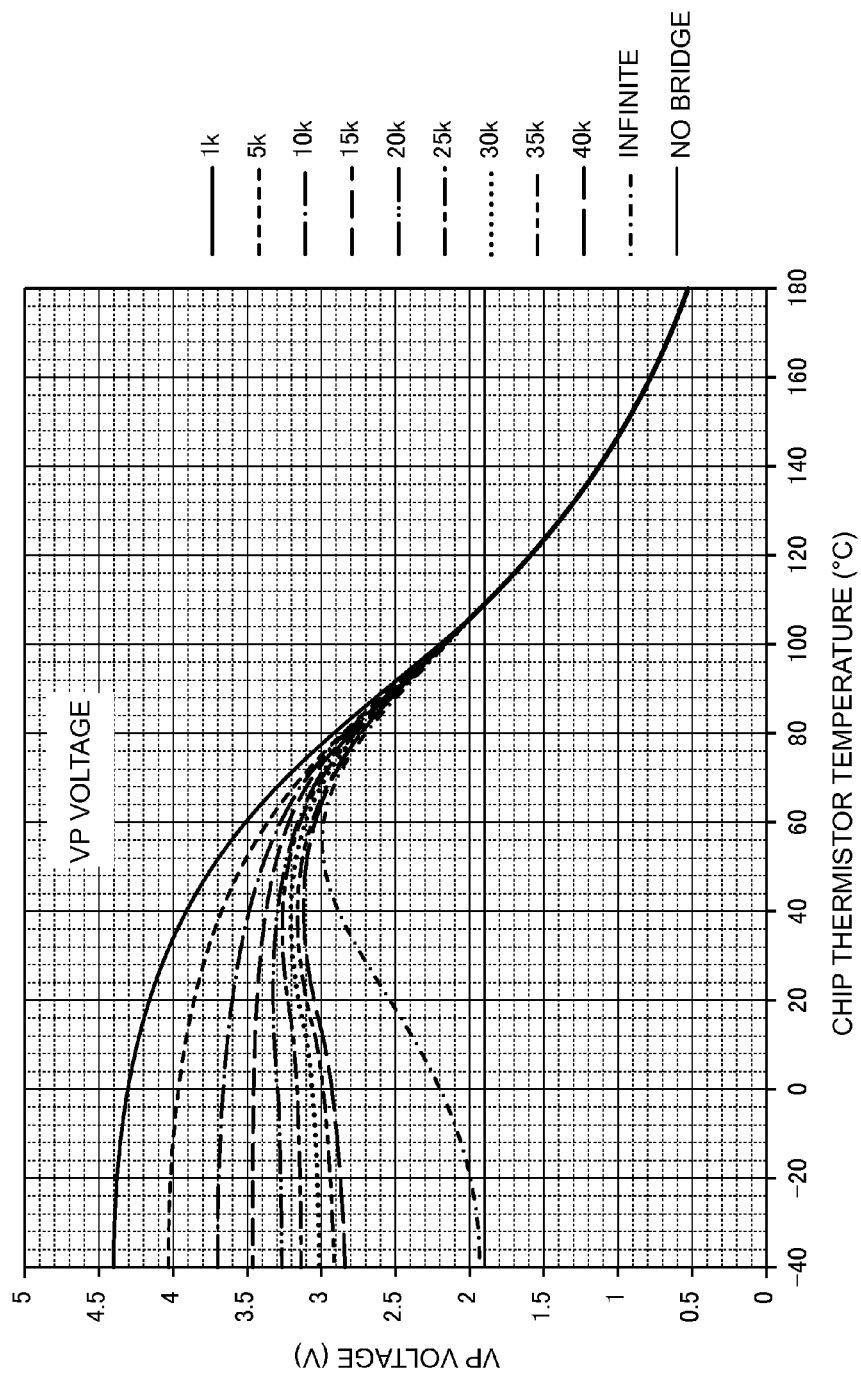
FIG. 22 is a graph illustrating examples of change in an overload threshold value voltage VP with chip thermistor temperature in the fifth exemplary embodiment of the present invention.

FIG. 22 illustrates examples of change in the overload threshold value voltage VP corresponding to varying parallel resistor RBP resistance values in the present exemplary embodiment. In FIG. 22, the overload threshold value voltage VP is calculated for parallel resistor RBP resistance values varied through 1, 5, 10, 15, 20, 25, 30, 35, and 40 kΩ, and for an infinite resistance value in a case in which the parallel resistor RBP is not provided. In each case, the overload threshold value voltage VP decreases more than when the bridge thermistor RTB is not provided and there is no bridge for a high temperature region of an equilibrium temperature, where the overload threshold value voltage VP is the same as when there is no bridge present, or higher. The difference between the overload threshold value voltages VP is discernable for a low temperature region lower than the equilibrium temperature. In the present exemplary embodiment, the parallel resistor RBP is connected in parallel with the bridge thermistor RTB, such that the parallel resistor RBP suppresses changes in the resistance value of the bridge thermistor RTB due to temperature. As a result, the drop in the overload threshold value voltage VP is reduced in comparison to when the parallel resistor RBP is not present for the low temperature region of the equilibrium temperature and below. The lower the resistance value of the parallel resistor RBP, the greater the reduction in the drop in the overload threshold value voltage VP in the low temperature region.

Providing the bridge thermistor RTB enables the overload threshold value voltage VP to be decreased in the high temperature region, similarly to in the third exemplary embodiment. However, in the low temperature region, the overload threshold value voltage VP is higher than when the bridge thermistor RTB is not provided. The overload threshold value voltage VP is at a maximum at a chip thermistor temperature of 57° C., but starts decreasing as the temperature drops below 57° C. When the value of the overload threshold value voltage VP exhibits such a characteristic of changing with temperature in the low temperature region of the equilibrium temperature and below, there is a concern of the overload threshold value voltage VP changing with the ambient temperature during product testing, affecting test results. In the present exemplary embodiment, the drop in the overload threshold value voltage VP in the low temperature region of the equilibrium temperature and below is suppressed, thereby enabling concern regarding issues arising during product testing in the low temperature region to be lessened. For example, when the parallel resistor RBP is set at 20 kΩ, change in the overload threshold value voltage VP is reduced over the range 20° C.±20° C., enabling elimination of the effects of ambient temperature during product testing at shipment.

Figure 23:
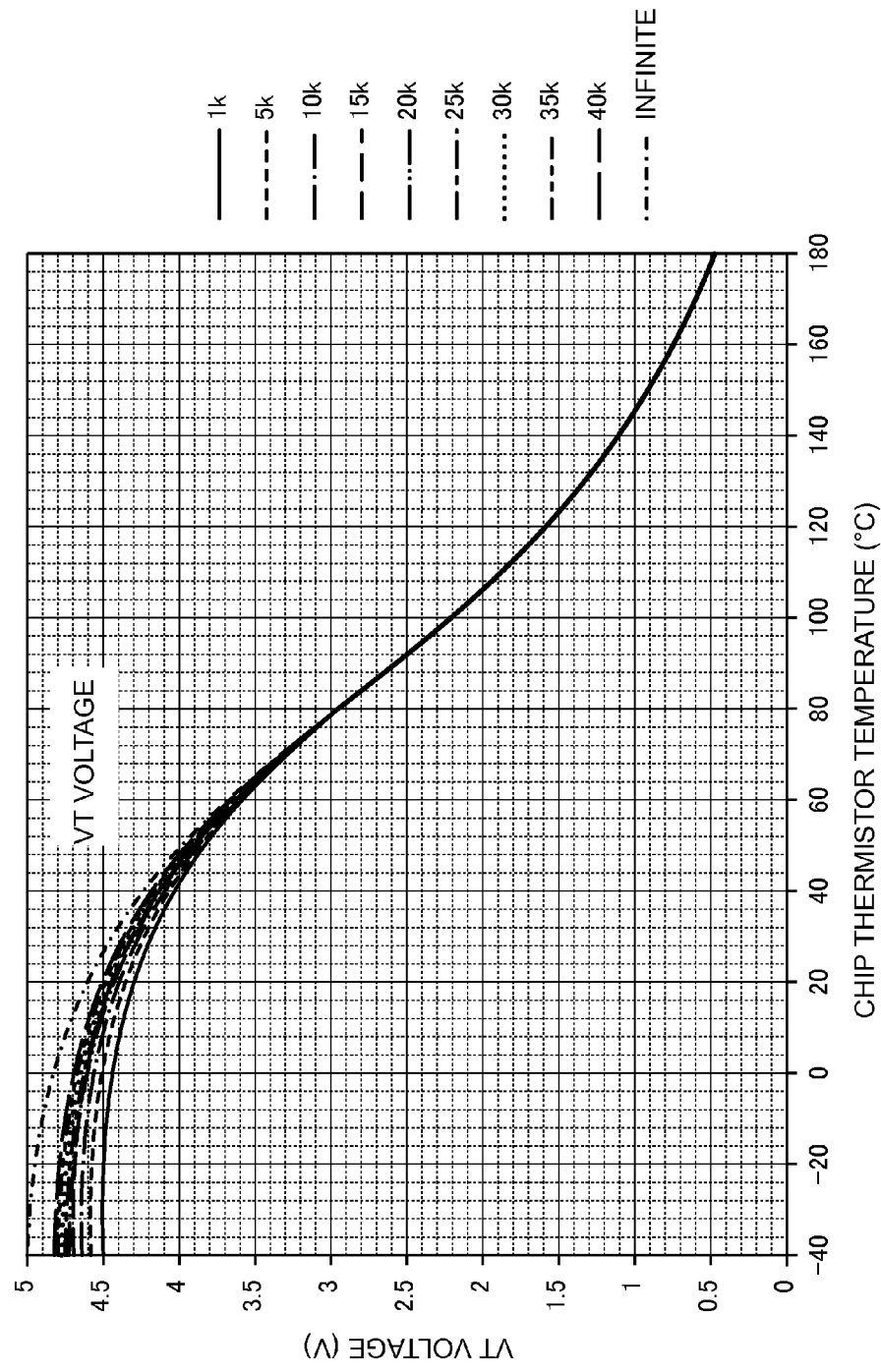
FIG. 23 is a graph illustrating examples of change in a chip thermistor voltage VT with chip thermistor temperature in the fifth exemplary embodiment of the present invention.
Figure 24:
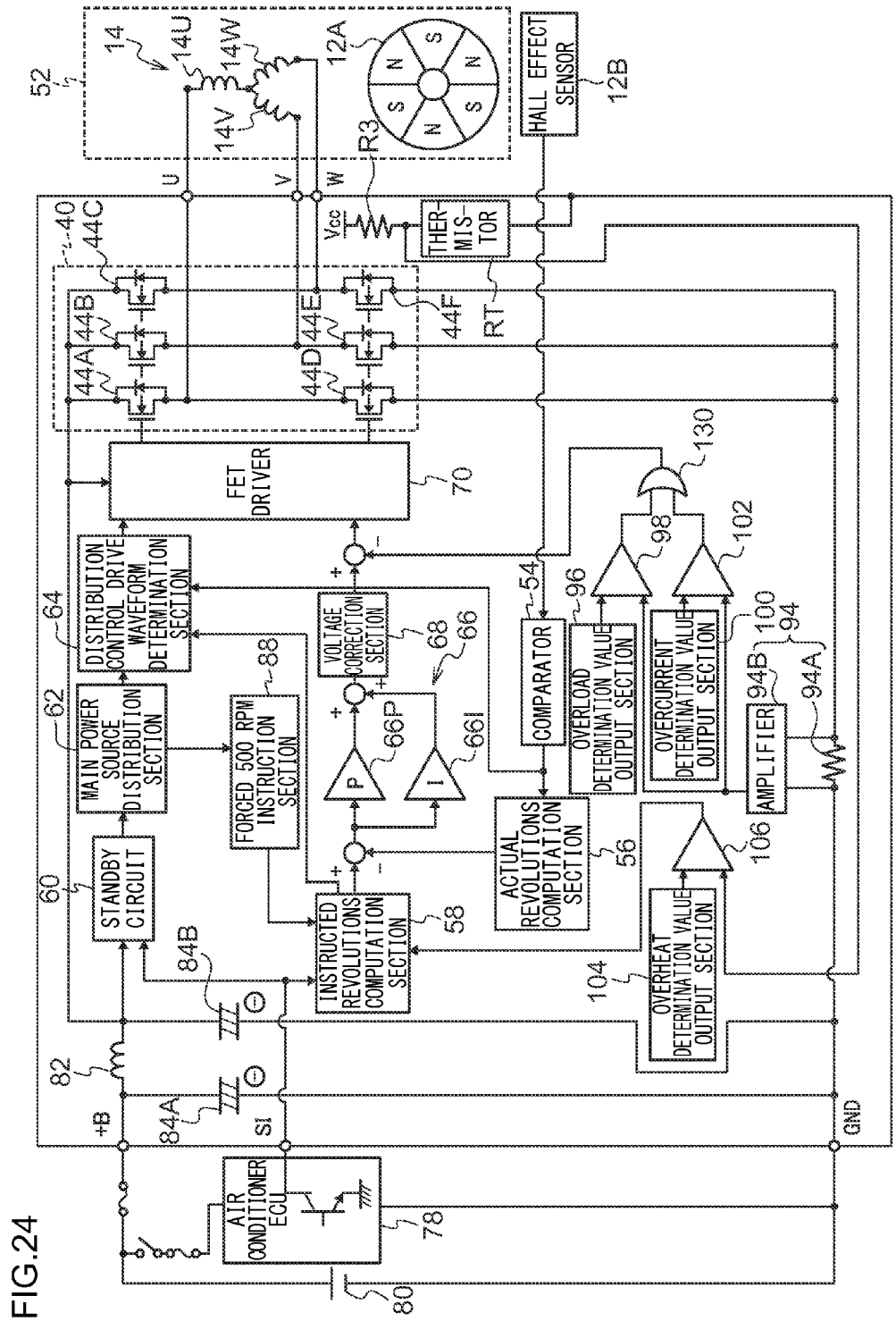
FIG. 24 is a schematic view illustrating an example of a motor controller that determines motor overload based on a current value between an inverter circuit and the negative electrode of a battery.

FIG. 23 illustrates an example of changes to the chip thermistor voltage VT corresponding to varying parallel resistor RBP resistance values in the present exemplary embodiment, calculated using Equation (8). As illustrated in FIG. 23, there is no large change in the value of the chip thermistor voltage VT even when employing the bridge thermistor RTB, and so determination of an overheated circuit state by the overheated state determination section 106 is not hindered in the present exemplary embodiment.

As described above, in the present exemplary embodiment the bridge thermistor RTB is provided with the parallel resistor RBP, the parallel resistor RBP thereby alleviating the bridge thermistor RTB characteristic of increasing resistance values in the low temperature region, and suppressing a drop in the overload threshold value voltage VP in the low temperature region. Change in the overload threshold value voltage VP in the low temperature region is accordingly reduced compared to when the parallel resistor RBP is not provided, enabling the effect of ambient factory temperature on test results to be reduced during product testing at shipment.

What is claimed is:

1. A motor controller comprising:
a current detection section that detects a current flowing between a power source and an inverter circuit generating a voltage applied to a coil of a motor;
an overload determination value output section that outputs an overload determination value used to determine whether or not the motor is overloaded;
an overload determination section that determines the motor to be overloaded in a case in which a current value detected by the current detection section is equal to or greater than the overload determination value; and
a rotation speed control section that controls to reduce the motor rotation speed to a specific speed in a case in which the overload determination section has determined the motor to be overloaded;
a thermistor that has one terminal to which a voltage is applied across a resistor, has another terminal connected to ground, and has a resistance value that changes with temperature; and
a connection section that connects together the one terminal of the thermistor and an output terminal of the overload determination value output section, so as to divide the overload determination value voltage with increasing temperature.

2. The motor controller of claim 1, further comprising a resistor connected in parallel with the thermistor.

3. The motor controller of claim 2, wherein:
the thermistor has characteristics of a resistance value that decreases with increasing temperature; and
the connection section is a resistor with one terminal connected to the one terminal of the thermistor, and another terminal connected to the overload determination value output section.

4. The motor controller of claim 2, wherein:
the thermistor has characteristics of a resistance value that decreases with increasing temperature; and
the connection section is a temperature variable resistor that has characteristics of a resistance value that decreases with increasing temperature, that is connected to the one terminal of the thermistor and to an output terminal of the overload determination value output section, and that decreases the voltage of the overload determination value output from the output terminal of the overload determination value output section with increasing temperature.

5. The motor controller of claim 4, further comprising a resistor connected in parallel with the temperature variable resistor.

6. The motor controller of claim 5, wherein the temperature variable resistor is a thermistor.

7. The motor controller of claim 4, wherein the temperature variable resistor is a thermistor.

8. The motor controller of claim 2, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

9. The motor controller of claim 1, wherein:
the thermistor has characteristics of a resistance value that decreases with increasing temperature; and
the connection section is a resistor with one terminal connected to the one terminal of the thermistor, and another terminal connected to the overload determination value output section.

10. The motor controller of claim 9, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

11. The motor controller of claim 1, wherein:
the thermistor has characteristics of a resistance value that decreases with increasing temperature; and
the connection section is a temperature variable resistor that has characteristics of a resistance value that decreases with increasing temperature, that is connected to the one terminal of the thermistor and to an output terminal of the overload determination value output section, and that decreases the voltage of the overload determination value output from the output terminal of the overload determination value output section with increasing temperature.

12. The motor controller of claim 11, further comprising a resistor connected in parallel with the temperature variable resistor.

13. The motor controller of claim 12, wherein the temperature variable resistor is a thermistor.

14. The motor controller of claim 12, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

15. The motor controller of claim 11, wherein the temperature variable resistor is a thermistor.

16. The motor controller of claim 15, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

17. The motor controller of claim 11, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

18. The motor controller of claim 1, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

19. The motor controller of claim 1, further comprising:
an overcurrent determination value output section that outputs an overcurrent determination value exceeding the overload determination value; and
an overcurrent determination section that determines the motor to be in an overcurrent state in a case in which a current value detected by the current detection section is equal to or greater than the overcurrent determination value; and
wherein the rotation speed control section stops rotation of the motor for a specific duration in a case in which the overcurrent determination section has determined the motor to be in an overcurrent state.

* * * * *